(12) United States Patent
Herman

(10) Patent No.: US 11,075,914 B2
(45) Date of Patent: *Jul. 27, 2021

(54) SOCIAL NETWORKING PLATFORM WITH ADULT DROP-IN REVIEW

(71) Applicant: Kinzoo Technologies, Inc., Vancouver (CA)

(72) Inventor: Sean Herman, Vancouver (CA)

(73) Assignee: KINZOO TECHNOLOGIES, INC., Vancouver (CA)

( * ) Notice: Subject to any disclaimer, the term of this patent is extended or adjusted under 35 U.S.C. 154(b) by 284 days.

This patent is subject to a terminal disclaimer.

(21) Appl. No.: 16/236,128

(22) Filed: Dec. 28, 2018

(65) Prior Publication Data

US 2020/0213321 A1 Jul. 2, 2020

(51) Int. Cl.
*H04L 29/06* (2006.01)
*H04L 29/08* (2006.01)
*H04L 12/58* (2006.01)
*G06F 16/955* (2019.01)

(52) U.S. Cl.
CPC .......... *H04L 63/102* (2013.01); *G06F 16/955* (2019.01); *H04L 51/32* (2013.01); *H04L 63/105* (2013.01); *H04L 67/306* (2013.01)

(58) Field of Classification Search
CPC ....... H04L 63/105; H04L 51/10; H04L 51/32; H04L 67/22; H04L 67/26; H04L 67/306
See application file for complete search history.

(56) References Cited

U.S. PATENT DOCUMENTS

| 10,083,245 | B1* | 9/2018 | Jezewski | H04L 67/34 |
|---|---|---|---|---|
| 2011/0047012 | A1* | 2/2011 | Sherman | G06Q 30/02 |
| | | | | 705/14.1 |
| 2011/0185399 | A1* | 7/2011 | Webber | H04L 63/104 |
| | | | | 726/4 |
| 2013/0097261 | A1* | 4/2013 | Baer | H04L 51/12 |
| | | | | 709/206 |
| 2013/0159443 | A1* | 6/2013 | Dellenbach | H04L 51/043 |
| | | | | 709/206 |
| 2014/0150068 | A1* | 5/2014 | Janzer | H04L 63/20 |
| | | | | 726/4 |
| 2014/0195626 | A1* | 7/2014 | Ruff | H04W 12/088 |
| | | | | 709/206 |
| 2014/0304014 | A1* | 10/2014 | Lee | G06Q 50/14 |
| | | | | 705/5 |
| 2015/0278775 | A1* | 10/2015 | Kosloski | G06Q 20/384 |
| | | | | 705/39 |
| 2015/0334335 | A1* | 11/2015 | White | H04N 5/4403 |
| | | | | 348/734 |
| 2016/0094541 | A1* | 3/2016 | Tan | H04L 63/0853 |
| | | | | 713/156 |
| 2016/0352789 | A1* | 12/2016 | Mahajan | H04W 4/21 |
| 2016/0361663 | A1* | 12/2016 | Watry | A63H 3/006 |

(Continued)

*Primary Examiner* — Arvin Eskandarnia

(57) ABSTRACT

Embodiments of the present invention provide a Social Networking and video sharing platform for children and parents. A private video sharing system enables children to send and receive videos, comment on videos, and add friends who interact with the videos. The Social Networking platform disclosed herein provides parental drop-in features for enabling a parent account to "drop-in" to an associated child account to review the account activity and report any inappropriate, unwanted, or offensive behavior or media.

28 Claims, 39 Drawing Sheets

(56) References Cited

U.S. PATENT DOCUMENTS

2019/0102459 A1* 4/2019 Patterson .............. G06F 40/295
2019/0158484 A1* 5/2019 Grunewald ............ A63F 13/73
2020/0074882 A1* 3/2020 Paulin ................... G16H 20/60

* cited by examiner

SOCIAL NETWORKING PLATFORM WITH ADULT DROP-IN REVIEW

CROSS-REFERENCE TO RELATED APPLICATIONS

This application is related to patent application No. 16/236,108 entitled "SOCIAL MEDIA PLATFORM WITH ADULT OVERSIGHT AND CONTROL," which is hereby incorporated by reference in its entirety.

FIELD

Embodiments of the present invention generally relate to the field of Social Networking applications. More specifically, embodiments of the present invention relate to systems and methods for providing child-oriented Social Networking services with adult (e.g., parental) control and oversight.

BACKGROUND

There is a growing need in the field of Social Networking applications and services to provide a child-oriented platform for gathering, communicating, and sharing child-appropriate media with others. Traditional Social Networking services often fail to provide filtering and oversight features that allow parents to effectively control and monitor what content is visible to their children when using Social Networking, and how their children interact with others. Furthermore, these platforms are largely unable to allow a parent to view or control who their child communicates with and what groups they are able to join, and the specific content to which the children view and interact.

In most cases, only the owner of an account is allowed to view certain information associated with that account. However, in some cases, parents may wish to view and monitor their child's Social Networking activity from their own account without having to directly access their child's account. What is needed is a Social Networking platform that provides direct adult (e.g., parental) control and oversight so that children and parents can experience a safe and secure Social Networking environment.

SUMMARY OF THE INVENTION

Embodiments of the present invention provide a Social Networking and video sharing platform particularly useful for children and parents. The Social Networking platform provides parental controls to enable an adult (e.g., parent) account associated with a child account to control settings (e.g., privacy settings) of the child's account and to provide oversite as to the child's activities.

According to one embodiment, a method for controlling a Social Networking account using a parent Social Networking account is disclosed. The method includes receiving an invitation at the Social Networking account, where the Social Networking account is associated with a first user and is further associated with the parent Social Networking account, receiving an authorization request at the parent Social Networking account to approve the invitation, responding to the authorization request from the parent account to provide approval for the invitation, where the invitation is executed responsive to the approval, and sharing videos and comments with a second user using the Social Networking account after the invitation is executed.

According to another embodiment, the method further includes creating the parent Social Networking account, creating the Social Networking account using the parent Social Networking account, where the creating the Social Networking account using the parent Social Networking account automatically associates the Social Networking account with the parent Social Networking account, setting permission for the Social Networking account using the parent Social Networking account, and sharing videos, comments, and requests using the Social Networking account according to the permissions of the Social Networking account as set by the parent Social Networking account.

According to another embodiment, a system for controlling a Social Networking account using a parent Social Networking account is disclosed. The system includes a server that stores Social Networking content and permissions, and transmits the Social Networking content to client accounts according to said permissions, a first client account that receives an invitation for the Social Networking account, where the Social Networking account is associated with the parent Social Networking account, a second client account that receives an authorization request to approve the invitation, and a third client account, where the server transmits the Social Networking content to the first and second client accounts according to said permissions, where the second client account responds to the authorization request to provide approval for the invitation, where the invitation is executed by the server responsive to the approval, and where the third client account shares videos and comments with the first client account after the invitation is executed.

According to another embodiment, a system for providing access to Social Networking is disclosed. The system includes a memory configured to store data; and a processor configured to execute instructions for performing a method to control a child Social Networking account using a parent Social Networking account, the method includes receiving an invitation at the child Social Networking account to a first user, where the child Social Networking account is associated with the parent Social Networking account, receiving an authorization request at the parent Social Networking account to approve the invitation, responding to the authorization request from the parent account to provide approval for the invitation, where the invitation is executed responsive to the approval, and sharing videos and comments with the first user using the child Social Networking account after the invitation is executed.

According to a different embodiment, a computer implemented method of implementing a Social Networking application is disclosed. The method includes creating an adult account within the Social Networking application, where the creating the adult account includes responding to first user input from an adult user where the first user input provides information for defining the adult account including identification information of the adult user and identification information of a child user, creating a child account within the Social Networking application, where the creating the child account includes responding to second user input from a child user where the second user input provides information for defining the child account including identification information of the child user, linking together the adult account and the child account, receiving oversight information associated with the adult account that pertains to the child account where the oversight information includes permission information and notification information, and responding to the child user engaging with the child account. The responding includes enforcing the permission information on the child account where the enforcing includes regulating activities of the child account, and providing notifications to the adult account based on the notification information and based on the activities of the child account.

BRIEF DESCRIPTION OF THE DRAWINGS

The accompanying drawings, which are incorporated in and form a part of this specification and in which like numerals depict like elements, illustrate embodiments of the present disclosure and, together with the description, serve to explain the principles of the disclosure.

DETAILED DESCRIPTION

Figure 1:
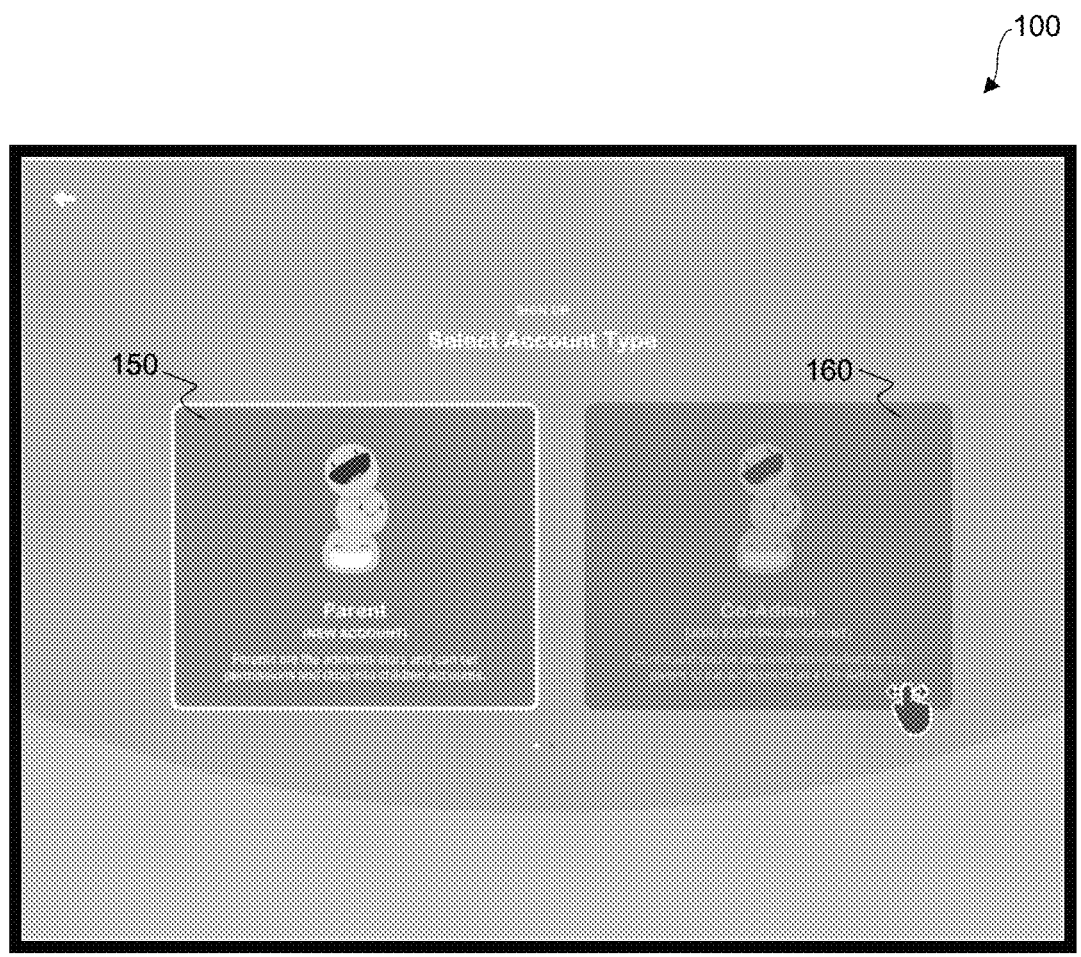
FIG. 1 depicts an exemplary on-screen user interface for creating a Social Networking account according to embodiments of the present invention.

Reference will now be made in detail to several embodiments. While the subject matter will be described in conjunction with the alternative embodiments, it will be understood that they are not intended to limit the claimed subject matter to these embodiments. On the contrary, the claimed subject matter is intended to cover alternative, modifications, and equivalents, which may be included within the spirit and scope of the claimed subject matter as defined by the appended claims.

Furthermore, in the following detailed description, numerous specific details are set forth in order to provide a thorough understanding of the claimed subject matter. However, it will be recognized by one skilled in the art that embodiments may be practiced without these specific details or with equivalents thereof. In other instances, well-known methods, procedures, components, and circuits have not been described in detail as not to unnecessarily obscure aspects and features of the subject matter.

Portions of the detailed description that follows are presented and discussed in terms of a computer-implemented method. Although steps and sequencing thereof are disclosed in a figure herein (e.g., FIGS. 35 and 36) describing the operations of this method, such steps and sequencing are exemplary. Embodiments are well suited to performing various other steps or variations of the steps recited in the flowchart of the figure herein, and in a sequence other than that depicted and described herein.

Some portions of the detailed description are presented in terms of procedures, steps, logic blocks, processing, and other symbolic representations of operations on data bits that can be performed on computer memory. These descriptions and representations are the means used by those skilled in the data processing arts to most effectively convey the substance of their work to others skilled in the art. A procedure, computer-executed step, logic block, process, etc., is here, and generally, conceived to be a self-consistent sequence of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout, discussions utilizing terms such as "accessing," "displaying," "writing," "storing," "transmitting," "associating," "identifying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Social Networking Platform with Adult Drop-in Review

Embodiments of the present invention provide a Social Networking and video sharing platform for children and parents. A private video sharing system enables children to send and receive videos from a list of contacts, comment on videos, and add friends to the contact list who can interact with the videos. The Social Networking platform disclosed herein provides parental controls to enable a parent account associated with a child account to control settings (e.g., privacy settings) of the child's account and oversee the child's activities.

Child and Parent Account Creation and Setup

With regard to FIG. 1, an exemplary on-screen user interface 100 for creating a Social Networking account is depicted according to embodiments of the present invention. At the onset of the user experience, the user may choose a parent account 150 to create a new user account for the parent, or a co-administrator account 160 to create a new account associated with an existing parent account. Herein, "parent" is used, but this term refers to any adult guardian having the appropriate responsibility to a child. By creating a new parent account 150, the parent is given administrative rights, can set permissions for associated child accounts, and can drop-in to associated child accounts to view account activity in much the same way as if they were logged in directly to the child account. A co-administrator account 160 can be created responsive to an invitation from an existing parent account and gives the user the same administrative rights, permissions, and drop-in capabilities as the primary administrator/parent account.

According to some embodiments, the creation of a parent account involves confirming the age of the parent to be over 18 years of age. The parent provides a user name, email address, first and last name, birth month and year, gender (optional), and selects a password for their account and for each child account to be associated with the parent account. According to some embodiments, a randomly generated code is emailed to the email address associated with the parent account, and the parent account user must enter the code to confirm their email address and activate the account.

When the parent account has been successfully activated, the user can login to the parent account to add a co-administrator or child account to be associated with the parent account. To create a new child account, the parent user provides details such as a user name, first and last name, birth month and year, gender (optional), and selects a password for each child account to be associated with the parent account. When the child logs into their account using the user name and password provided by the parent, the child is taken through an account creation process, for example, to create or select and account photo and choose a visual theme for their account. The account photo may be selected from an existing photo stored on the user's device or may be taken using a camera of the user's device, for example. Each child account is therefore associated with one parent account and optionally a co-parent account. According to some embodiments, the creation of a child account involves entering the age or birthdate of the child. Thereafter, the child account may automatically be removed from the Social Networking platform when the child reaches a predetermined age limit (e.g., 13 years of age).

Figure 2:
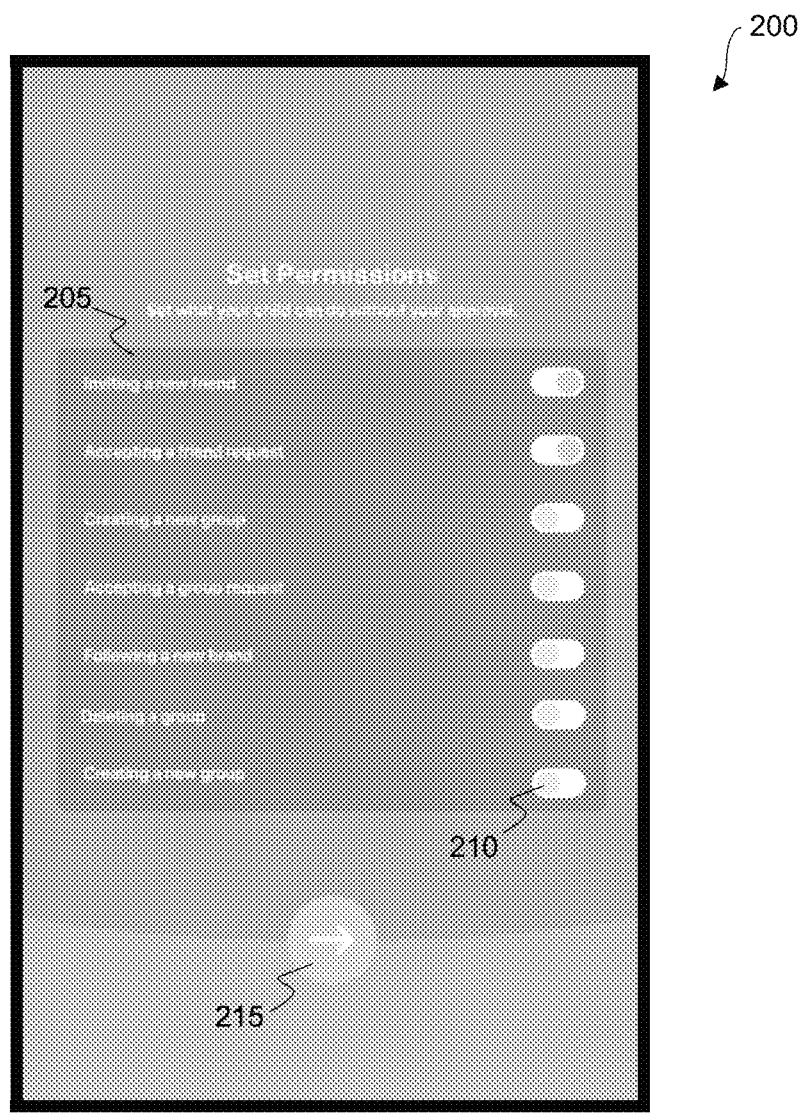
FIG. 2 depicts an exemplary on-screen user interface for setting permissions of a child account from an associated parent account according to embodiments of the present invention.

With regard to FIG. 2, an exemplary on-screen user interface 200 for creating a parent Social Networking account and setting permissions for an associated child account is depicted according to embodiments of the present invention. Permissions list 205 may include permission to invite new friends, accept a friend request, accept a group request, follow a new brand, delete a group, and create a new group, among others, for establishing limits for the linked child account. The permissions may be toggled on and off using the corresponding toggle button (e.g., toggle button 210) by interfacing with the graphical slider buttons. These permissions may be changed at a later time by editing the permission associated with the child account. When the permission have been set, the user selects next arrow 215 to continue the account creation process.

Figure 3:
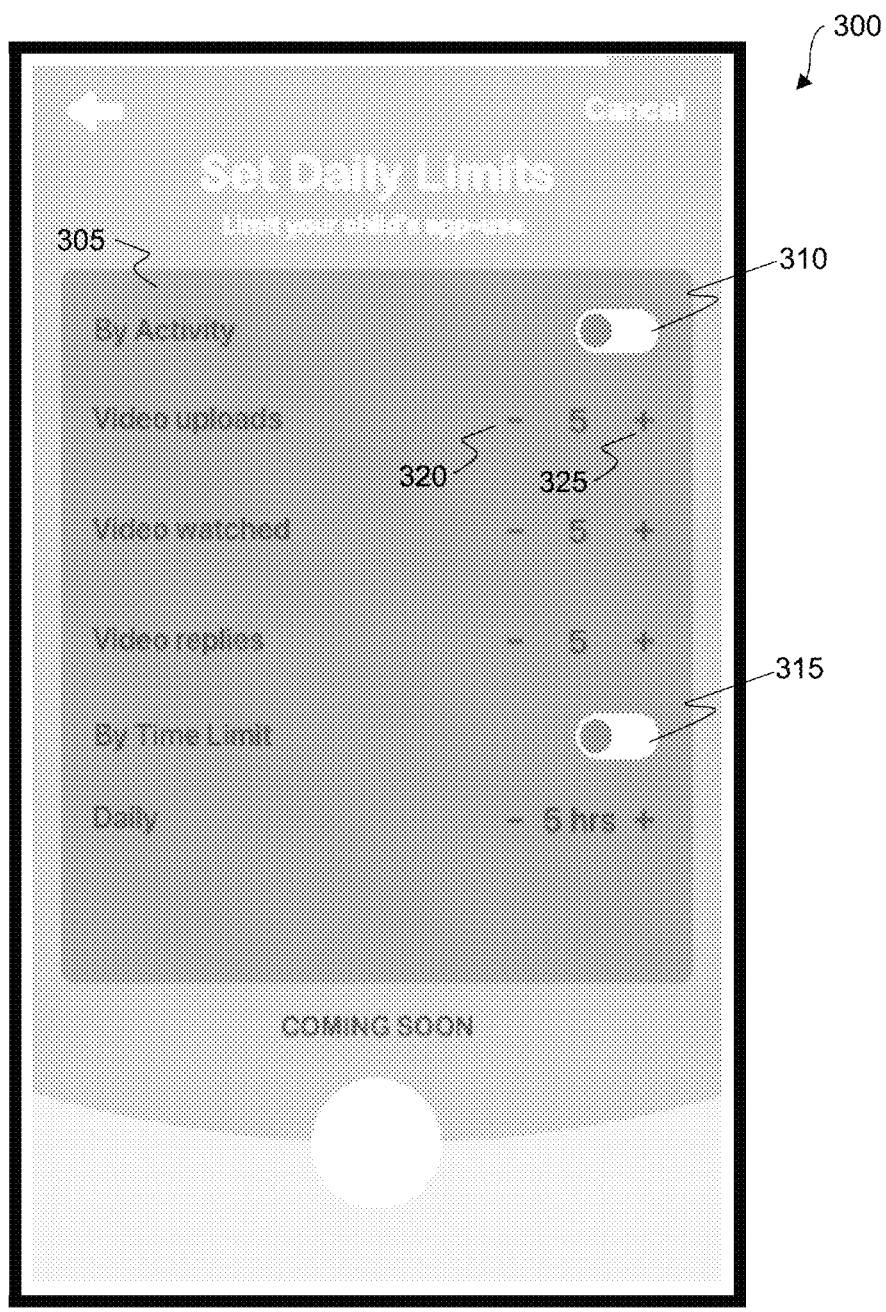
FIG. 3 depicts an exemplary on-screen user interface for configuring usage limitations of a child account from an associated parent account according to embodiments of the present invention.

With regard to FIG. 3, an exemplary on-screen user interface 300 for configuring usage limitations for an associated child account is depicted according to embodiments of the present invention. User interface 300 enables a parent account to set daily limitations 305 for associated child accounts, including activity limitations, such as the number of video uploads, the number of video views, the number of video replies, and time limitations, such as the amount of time spent using the Social Networking application. These limitations may be toggled on or off using toggle buttons 310 and 315. The value of the limitation may be increased or decreased using a respective increment button and a respective decrement button (e.g., increment button 320 and decrement button 325) of the graphical user interface 300.

Figure 4:
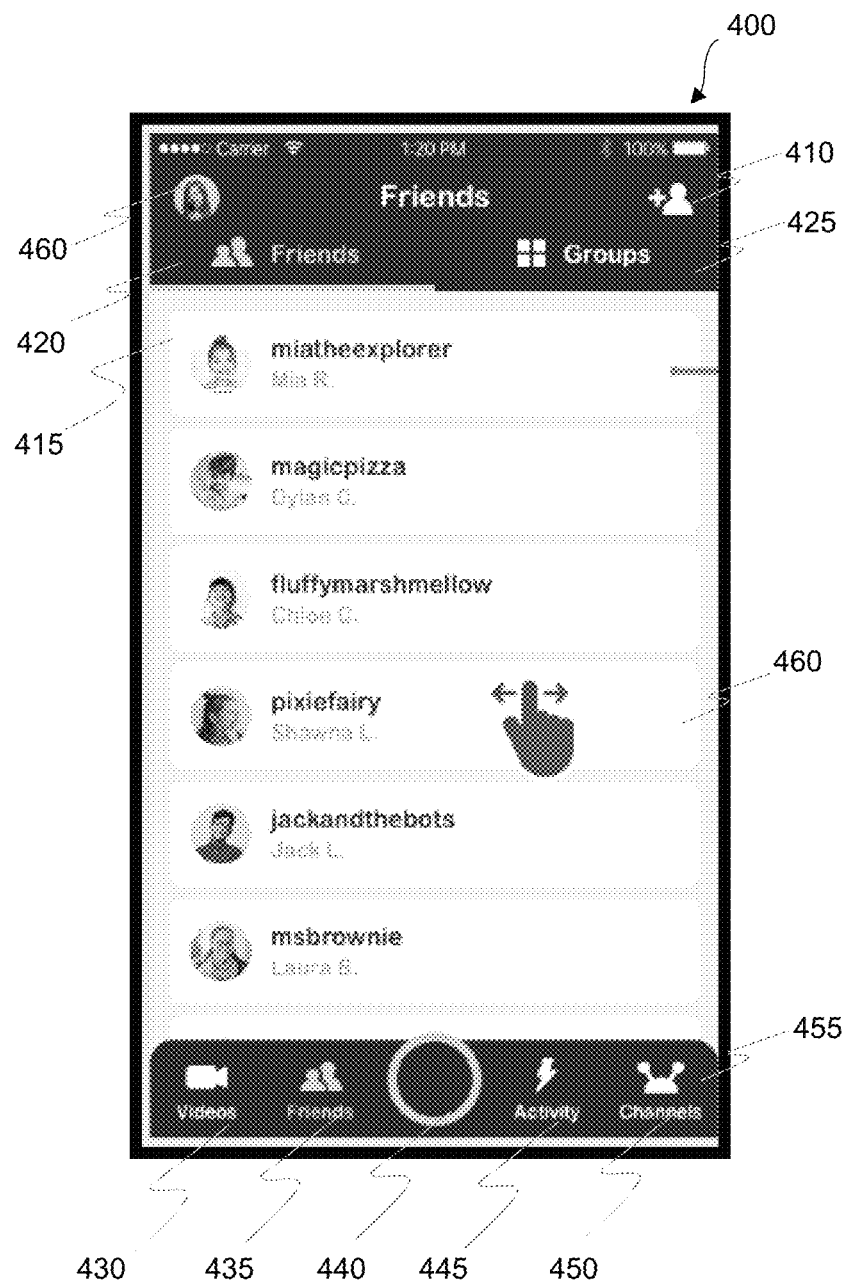
FIG. 4 depicts an exemplary on-screen user interface of a Social Networking application for displaying a friends list of a child user according to embodiments of the present invention.

With regard to FIG. 4, an exemplary on-screen user interface 400 of a Social Networking application for displaying a friends list 415 of a child user account is depicted according to embodiments of the present invention. The friends list 415 displays a list of users who are currently connected with the child user as friends on the Social Networking platform. By selecting add friend button 410, the user can add new friends to the friends list 415. By selecting a friend from friend list 415 (e.g., friend 460), the user can navigate to the public profile of the friend. According to some embodiments, adding a new friend to a user's account requires approval from the associated parent account, and may involve issuing a notification to the parent account indicating that a new friend request has been sent. The user's profile image is displayed in the upper left corner of interface 400 and can be selected to navigate to the user's main profile page (see FIG. 18).

User interface 400 includes navigation buttons for navigating to different pages of the Social Networking account. Near the top of interface 400, friends tab 420 and groups tab 425 may be used to navigate to the user's friends list and group list, respectively (see FIG. 8). The friends tab 420 and groups tab 425 may be selected by clicking on the respective tab, or the user can swipe left or right to change which tab is displayed. A child navigation bar 455 is provided at the bottom of user interface 400 for navigating to videos page 430, friends list page 435, video capture button 440, activity feed page 445, and channels list page 450.

Group Creation and Settings

Figure 5:
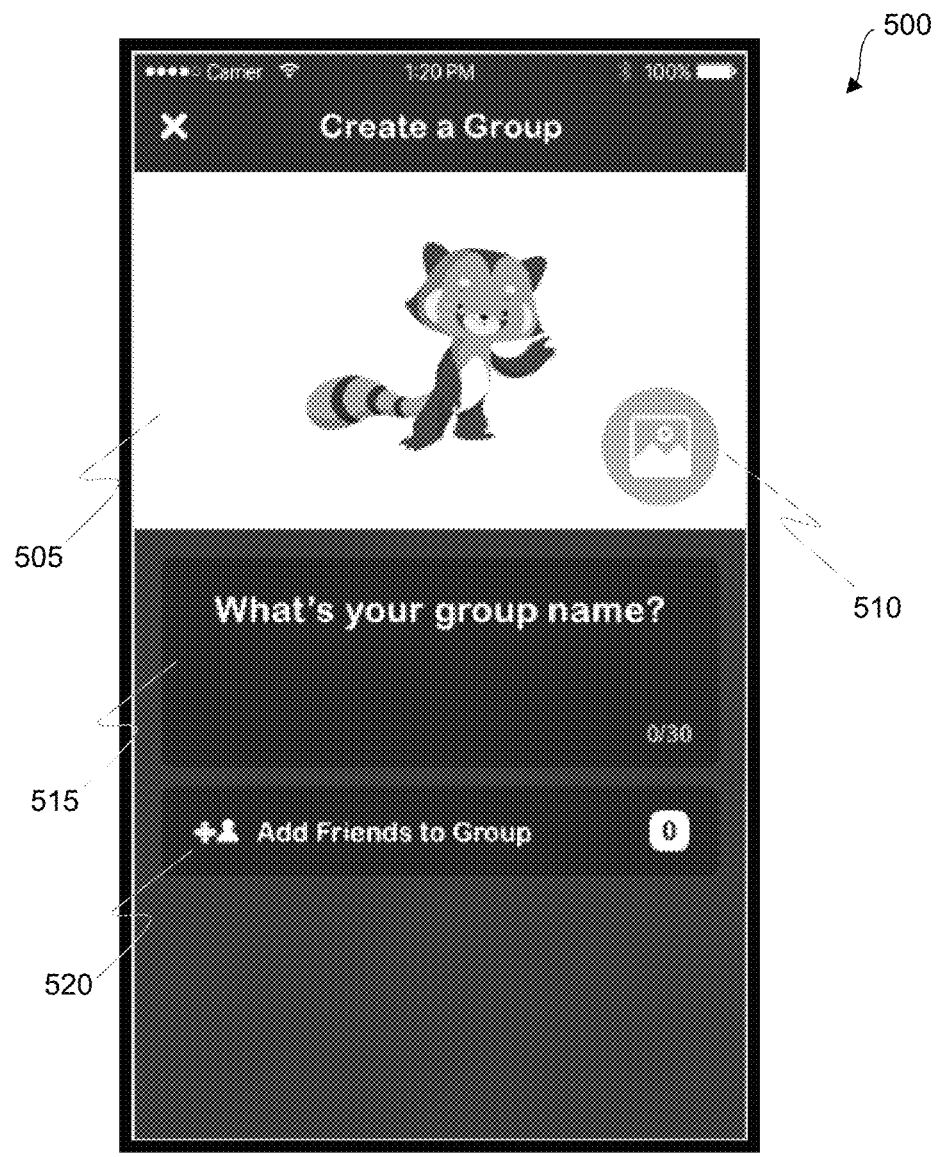
FIG. 5 depicts an exemplary on-screen user interface of a Social Networking application for creating a new user group according to embodiments of the present invention.

With regard to FIG. 5, an exemplary on-screen user interface 500 of a Social Networking application for creating a new user group is depicted according to embodiments of the present invention. Group image 505 is displayed and may be changed using change image button 510. A group name is entered using group name field 515. By selecting add friends button 520, the user can search for and add new friends to the user group. According to some embodiments, adding a new friend to a user group requires approval from the associated parent account, and may involve issuing a notification to the parent account indicating that a new friend has been added to a group. Once a group is established, certain Social Networking-related actions can be performed for the entire group, such as sending a video to a group.

Figure 6:
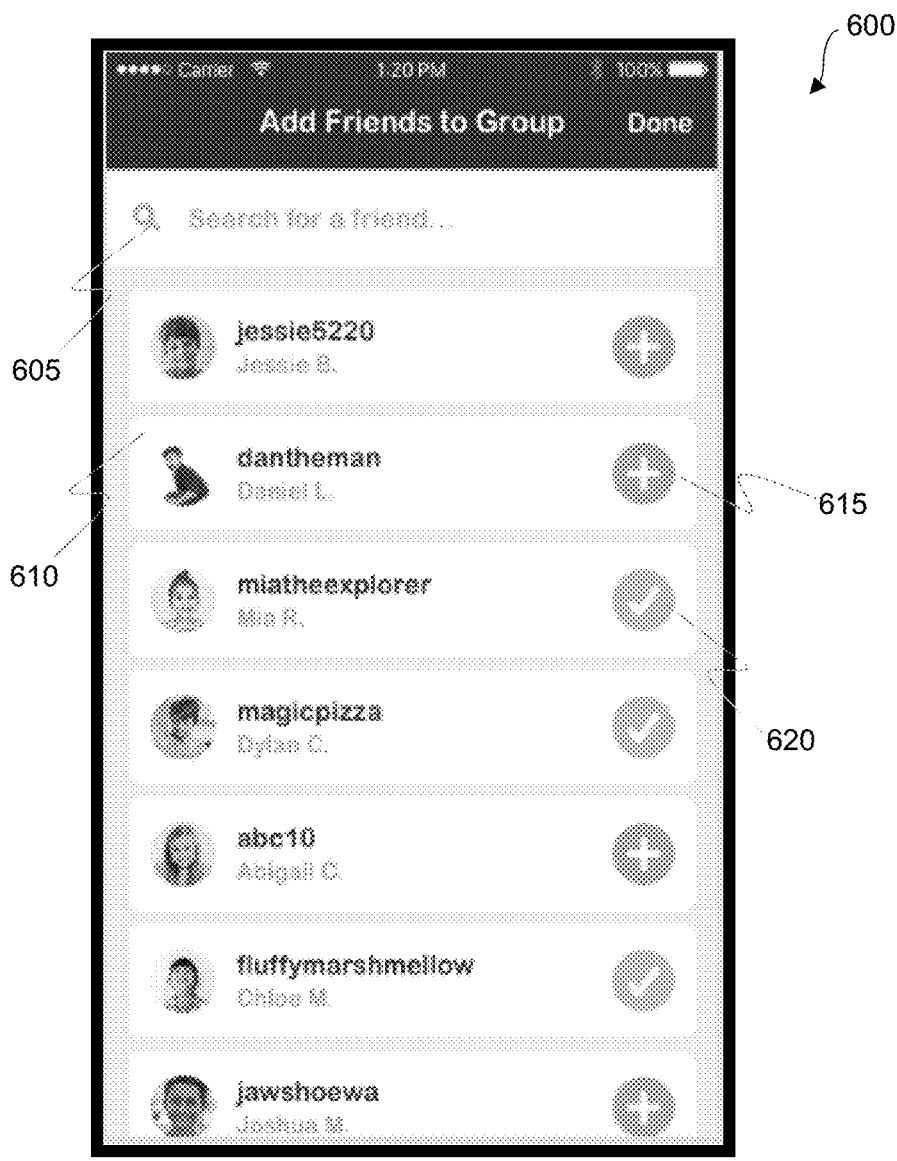
FIG. 6 depicts an exemplary on-screen user interface for adding friends to a new user group according to embodiments of the present invention.
Figure 7:
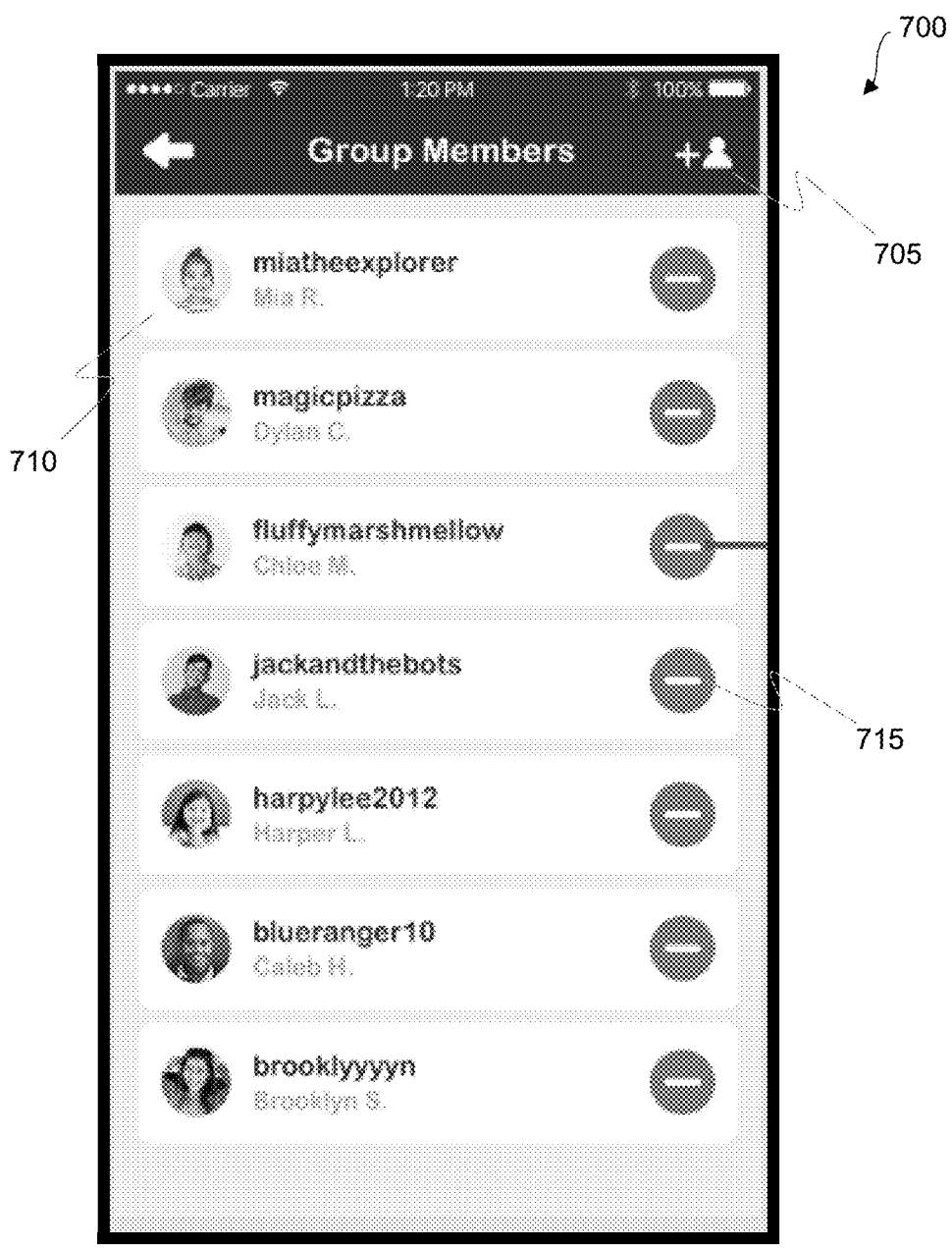
FIG. 7 depicts an exemplary on-screen user interface for removing friends from a new user group according to embodiments of the present invention.

In FIG. 6, according to embodiments of the present invention, exemplary on-screen user interface 600 is used to add friends to the user group. Search bar 605 is used to search for friends to add to the user group by (e.g., by user name), and friends can be added to the group by selecting the corresponding add to group button (e.g., add to group button 615 corresponding to user 610). A check mark 620 indicates that a friend has been successfully added to the user group. In FIG. 7, according to embodiments of the present invention, exemplary on-screen user interface 700 is used to remove friends from the new user group by selecting the corresponding remove from group button (e.g., remove from group button 715 corresponding to user 710). The user can return to the add friends to group interface 600 by selecting the add friends button 705. According to some embodiments, only approved friends of the user account may be added to user groups.

Figure 8:
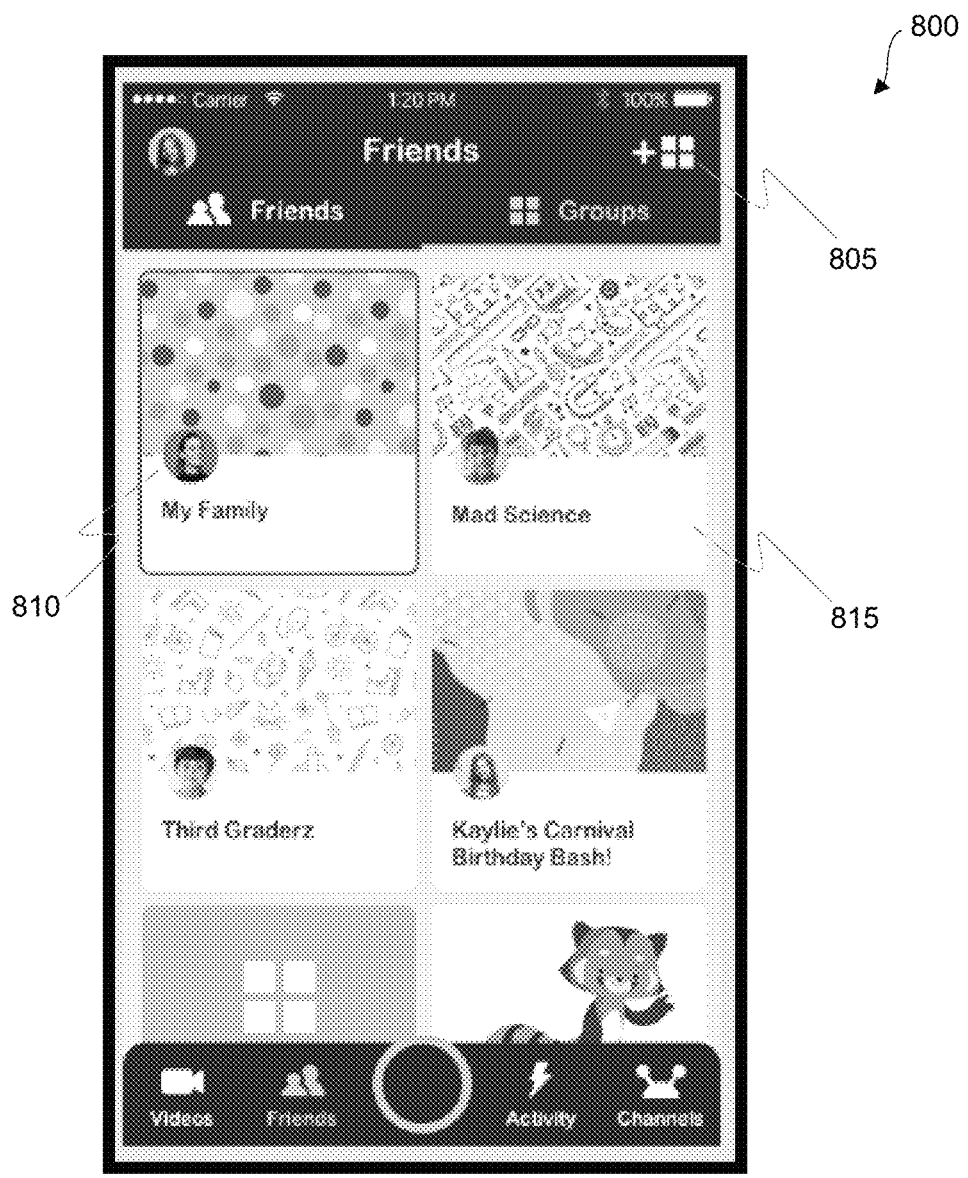
FIG. 8 depicts an exemplary on-screen user interface of a Social Networking application for displaying user groups associated with a user account according to embodiments of the present invention.

With regard to FIG. 8, an exemplary on-screen user interface 800 of a Social Networking application for displaying and organizing user groups associated with a user account is depicted according to embodiments of the present invention. The first group listed is the user's home group 810 (e.g., My Family), which may include user accounts of family members (e.g., parents, siblings, etc.), and the other groups listed (e.g., group 815) may include other user accounts. By selecting add group button 805, the user can create a new group and add friends to the group (see FIGS. 5 and 6). Groups are useful for organizing friends into categories defined by a group.

Figure 9:
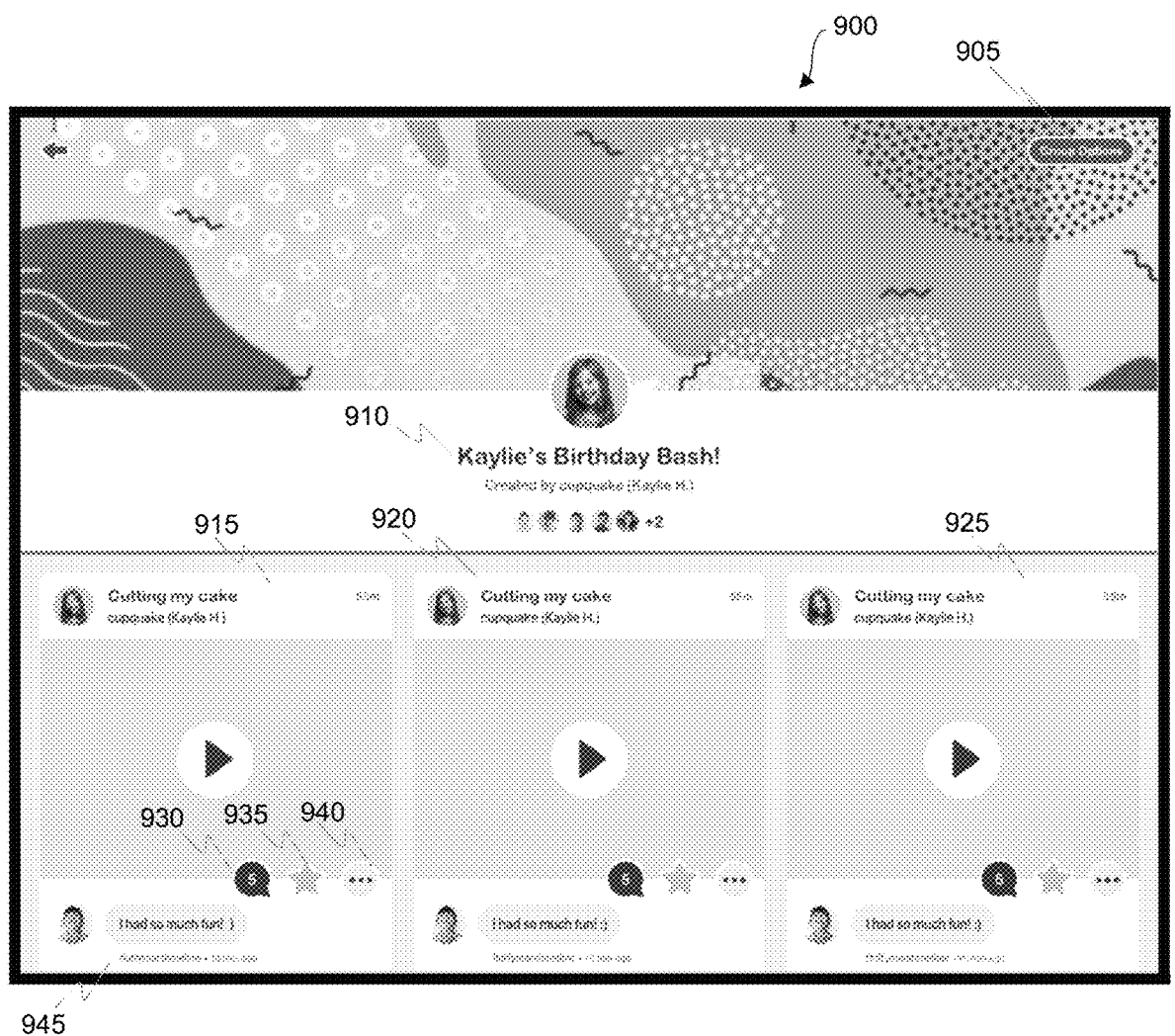
FIG. 9 depicts an exemplary on-screen user interface for displaying content that has been shared with a group to the owner/creator of the group according to embodiments of the present invention.

FIG. 9 depicts an exemplary on-screen graphical user interface 900 for displaying content that has been shared with a group (e.g., shared videos 915, 920, and 925) to the owner/creator of the group according to embodiments of the present invention. The group interface 900 shows detailed group information 910, including the group name, the group creator, and members of the group. Group options button 905 is used to navigate to a group configuration page for changing the name of the group and the group image. According to some embodiments, the group name of the "My Family" home group cannot be changed.

The shared videos displayed in group interface 900 are videos that are shared with the group by members of the group. The shared videos are displayed with detailed information, the title of the video, when the video was posted, and a thumbnail of the video. Furthermore, the number of comments 930, a favorite button 935, and more options button 940 are displayed for the shared videos. It is appreciated that shared videos may have an associated list of friend comments pertaining to the video. The more options button 940 may be selected to share or remove videos, for example. User comments 945 for a shared video are displayed below the shared video. When a user who is not the creator/owner of the group views the group page, the more options button 940 is not displayed, and the group options button 905 is replaced with a leave group button that can be used to leave the group.

Figure 10:
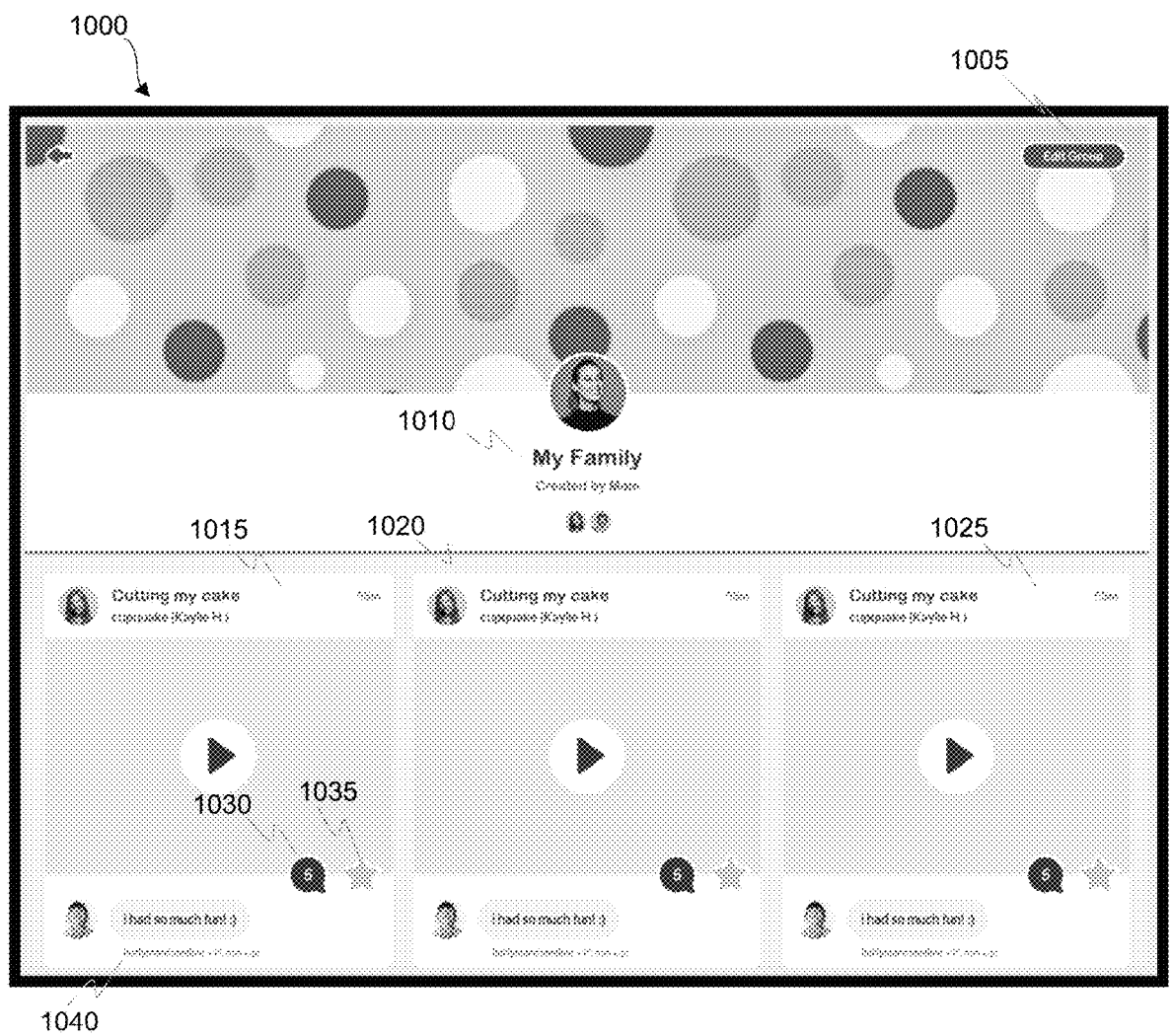
FIG. 10 depicts an exemplary on-screen user interface for displaying a home group to a parent account user according to embodiments of the present invention.

With regard to FIG. 10, an exemplary on-screen user interface 1000 for displaying a home group (e.g., My Family) to a parent account user is depicted according to embodiments of the present invention. Edit group button 1005 is used to navigate to a group configuration page to change the group image. When displaying the home group to a child account that is a member of the home group, the edit group button 1005 is not displayed.

Home group details 1010 displays the home group name "My Family," the group owner/creator, and the members of the group. The content of the home group is displayed, including shared videos 1015, 1020, and 1025. Each shared video displays video information such as the video title, the time when the video was posted, a number of comments 1030, and a favorite button 1035 for adding the video as a favorite video. User comments 1040 are displayed below the video information. According to some embodiments, the content of a comment is only displayed when the commenter is an approved friend of the user.

Capturing and Sharing Video with Friends and Groups

Figure 11:
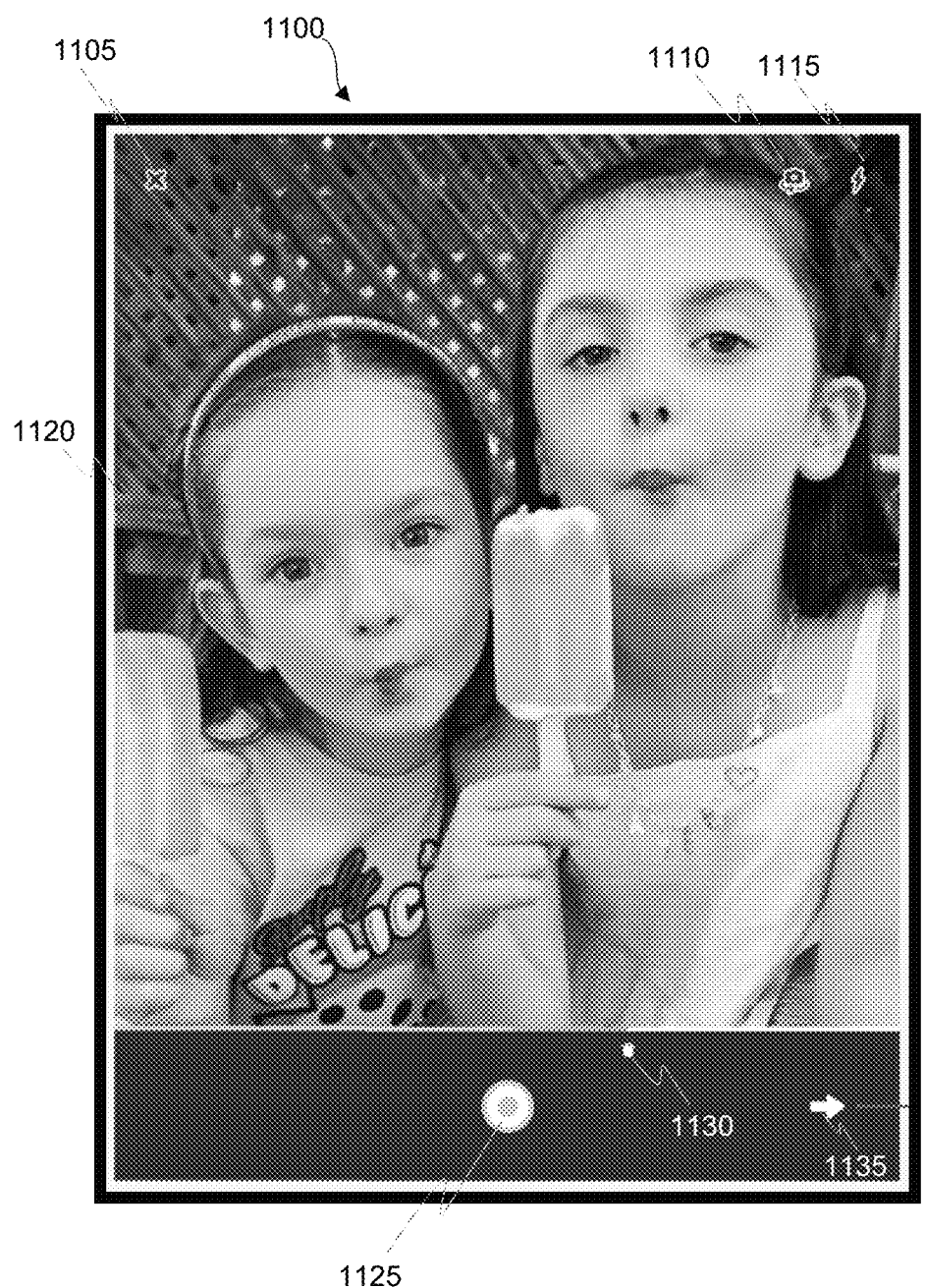
FIG. 11 depicts an exemplary on-screen user interface for capturing a new video to be shared on a Social Networking platform according to embodiments of the present invention.

With regard to FIG. 11, an exemplary on-screen user interface 1100 for capturing a new video with an electronic camera is depicted according to embodiments of the present invention. The captured video can be saved to the user's Social Networking account, shared with friends and groups, and optionally saved to device storage (e.g., a camera roll or device image library). User interface 1100 includes a close capture button 1105 to return to the previous page, flip camera button 1110 for toggling between a front facing camera and a rear facing camera, and a flash toggle button 1115 for selectively enabling and disabling camera flash. A real-time view 1120 of the camera feed is displayed and video capture button 1125 begins the recording process, where the video capture button 1125 may be selected again during capture to pause the capture. A delete capture button 1130 may be selected to delete the captured video clip, and a next button 1135 may be selected to navigate to a video details page. FIG. 11 illustrates an exemplary captured image from an exemplary captured video.

According to some embodiments, captured videos are accessible for a limited time (e.g., 30 days). According to some embodiments, captured videos that are not shared are immediately discarded. According to some embodiments, shared videos are limited to 60 seconds, and video replies are limited to 20 seconds.

Figure 12:
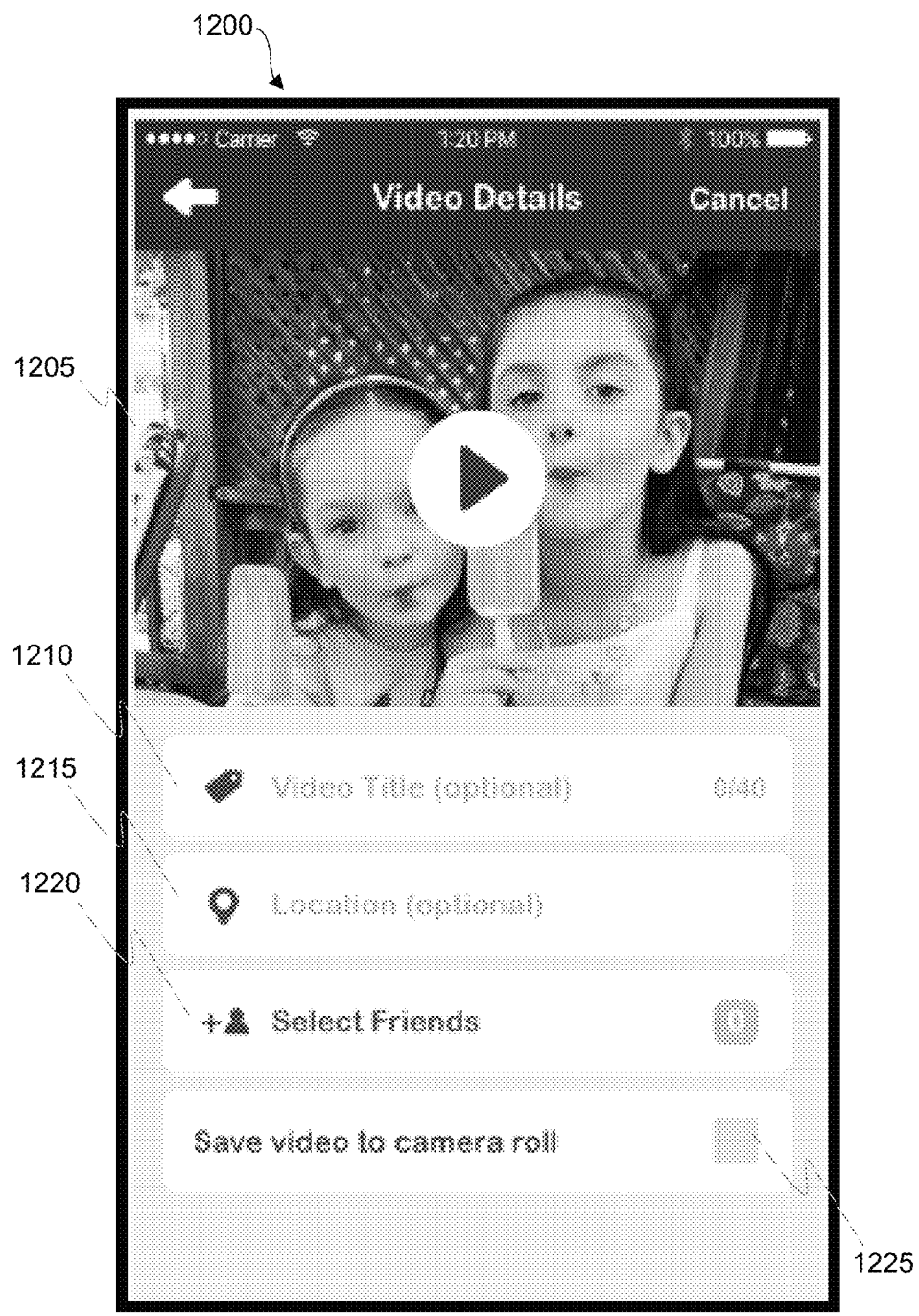
FIG. 12 depicts an exemplary on-screen user interface for displaying and entering detailed video information, including a video title and location (optional), sharing the video with friends, and saving the video to a storage device (e.g., camera roll) using a save video button according to embodiments of the present invention.

FIG. 12 depicts an exemplary on-screen graphical user interface 1200 for displaying and entering the detailed video information about a recently captured video, including the video title 1210 (optional) and location 1215 (optional), sharing the video with friends, and saving the video to a storage device (e.g., camera roll) using save video button 1225. A thumbnail/preview 1205 of the captured video is displayed and may be selected to play the video clip. By selecting select friends button 1220, the user can navigate to a select friends page for sharing the video with friends using the Social Networking platform.

Figure 13:
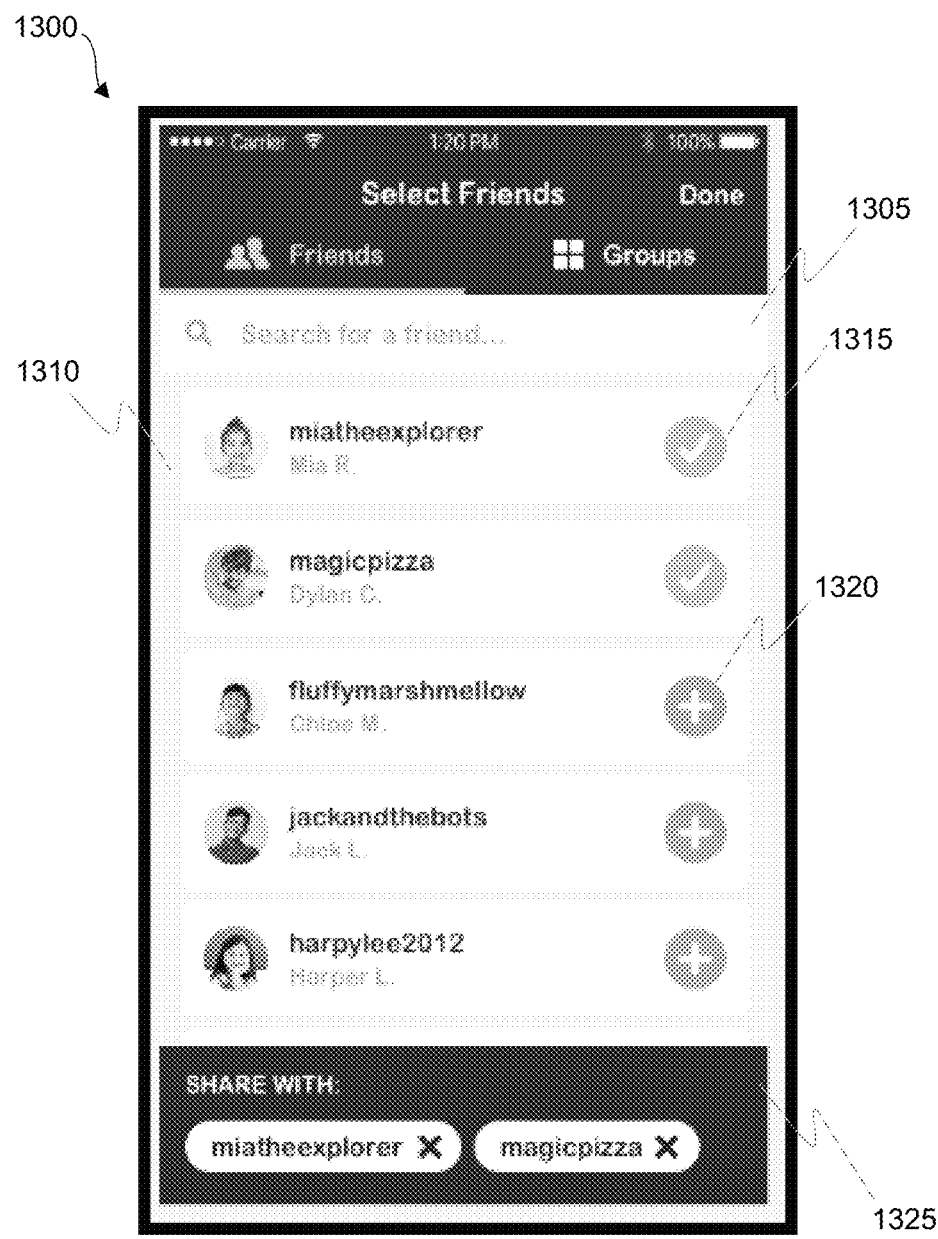
FIG. 13 depicts an exemplary on-screen user interface for sharing a captured video with friends according to embodiments of the present invention.
Figure 14:
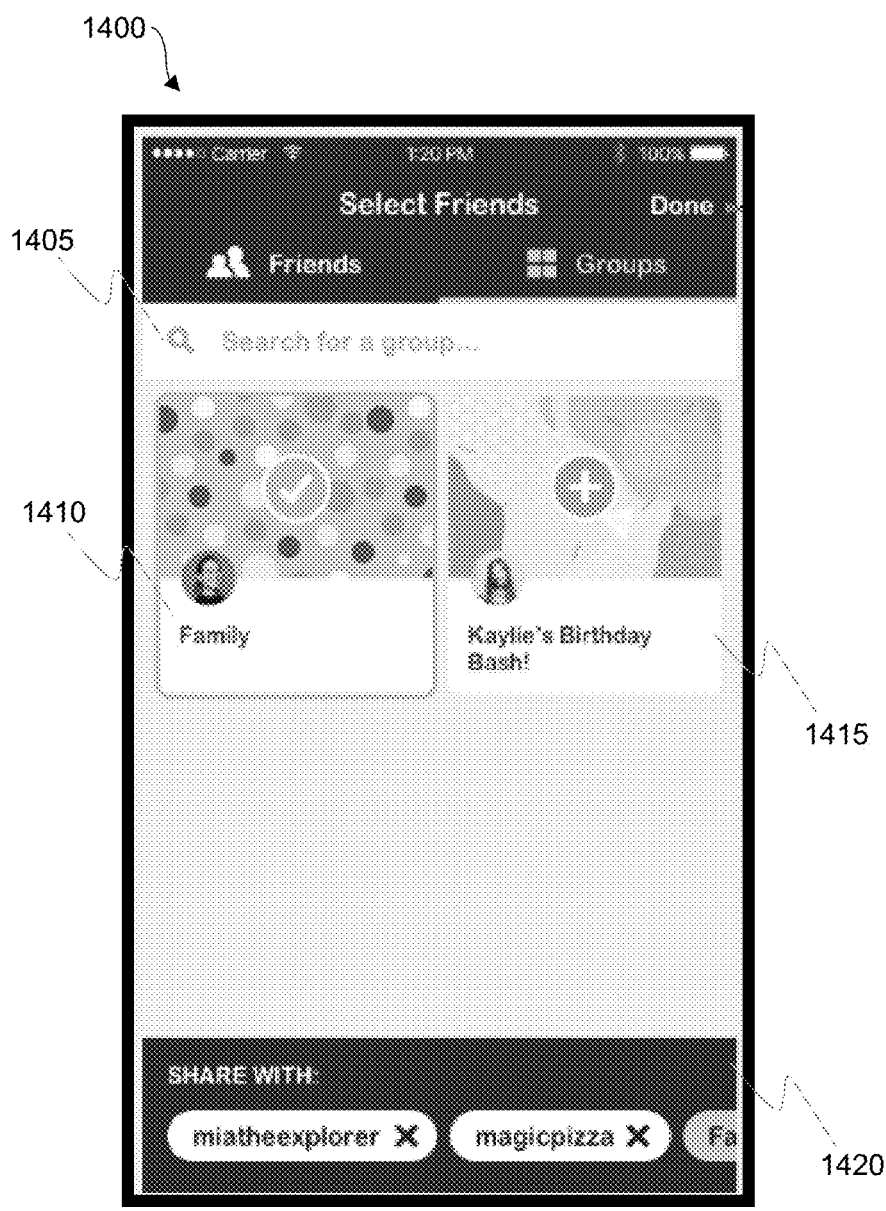
FIG. 14 depicts an exemplary on-screen user interface for sharing a video with multiple friends at once by selecting a group of friends according to embodiments of the present invention.

FIG. 13 depicts an exemplary on-screen graphical user interface 1300 for sharing a newly captured video with friends according to embodiments of the present invention. The user can search for friends (e.g., by user name) using search bar 1305. A list of friends 1310 is displayed and may be adjusted based on the content of search bar 1305. The user can select an add friend button (e.g., add friend button 1320) to share the video with the friend corresponding to the selected add friend button. A check mark 1315 indicates that the video will be shared with the friend corresponding to the displayed check mark, and the selected friends are listed at the bottom of interface 1300 in the share window 1325. Alternatively, a user may share a video with multiple friends at once using the select group interface 1400 depicted in FIG. 14 according to embodiments of the present invention. Under this approach, a user may search for and select groups to share a video with without having to select individual friends. The first group listed is the user's home group 1410, and other groups that the member belongs to are displayed next to the home group, such as friend group 1415. A search bar 1405 is provided to search for groups by name, and selected groups are listed in share window 1420. According to some embodiments, when a video is shared with a group, the identity of the group is not made known, and the recipients of the shared video are only able to see which users the video was shared with, but not their group status. In this fashion, the recipient of a shared video will not be aware that they are a member of the child's defined group.

Figure 15:
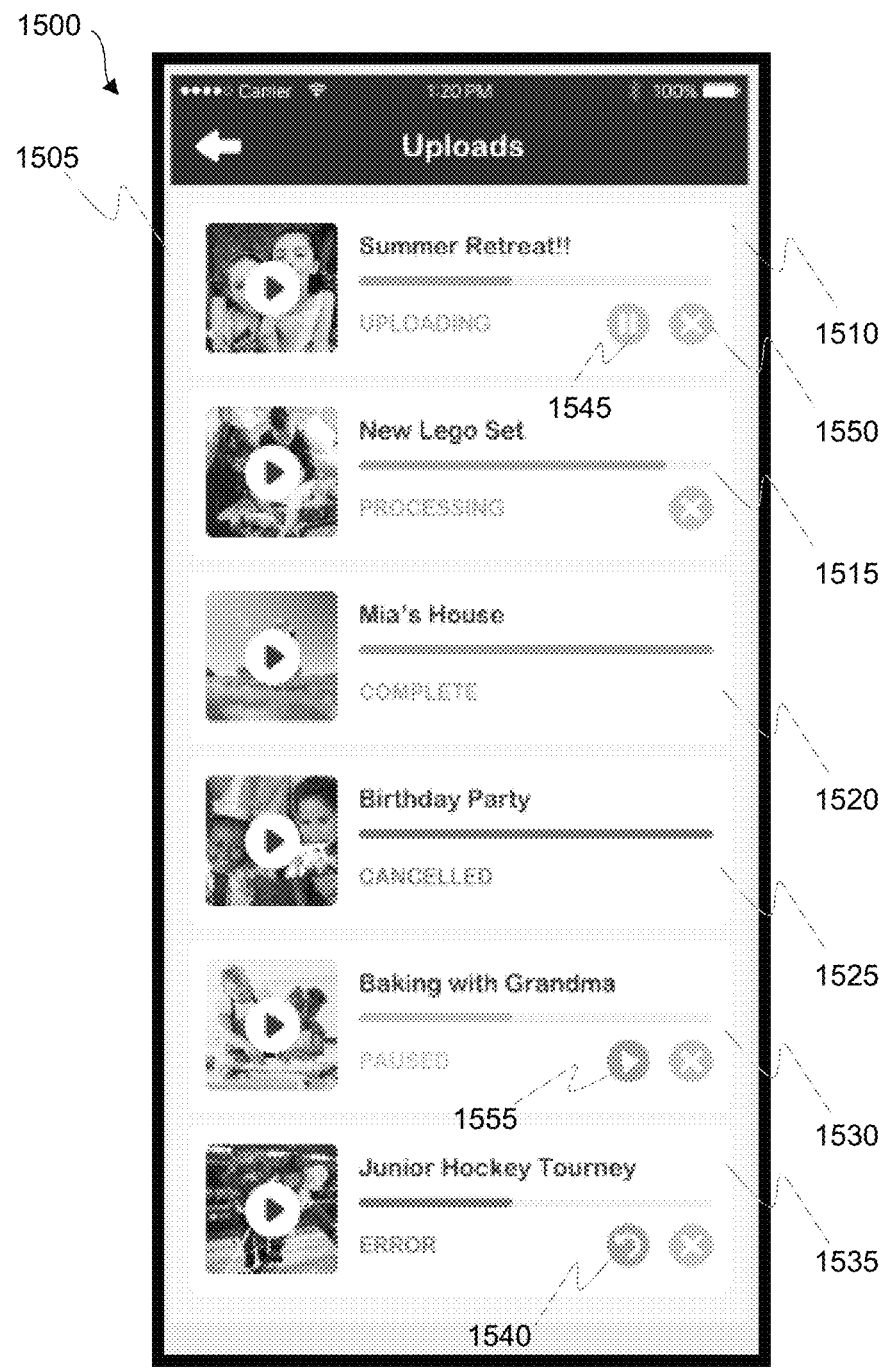
FIG. 15 depicts an exemplary on-screen user interface for displaying active and completed video uploads according to embodiments of the present invention.

FIG. 15 depicts an exemplary on-screen user interface 1500 for displaying active and completed video uploads. When a user captures a new video, the video is added to upload list 1505. As depicted in FIG. 15, the upload list 1505 may include videos that are currently being uploaded (e.g., video 1510), videos that have been uploaded and are currently being processed (e.g., video 1515), videos that have completed uploading and processing (e.g., video 1520), and videos that have been canceled (e.g., video 1525). Videos that are currently being uploaded can be paused or canceled by selecting the pause button 1545 or cancel button 1550, respectively. For videos that encounter an error during uploading or processing (e.g., video 1535), the user may select the retry button 1540 to upload and process the video again. A paused video 1530 can be played by selecting the play button 1555.

User Account Activity and Notifications

Figure 16:
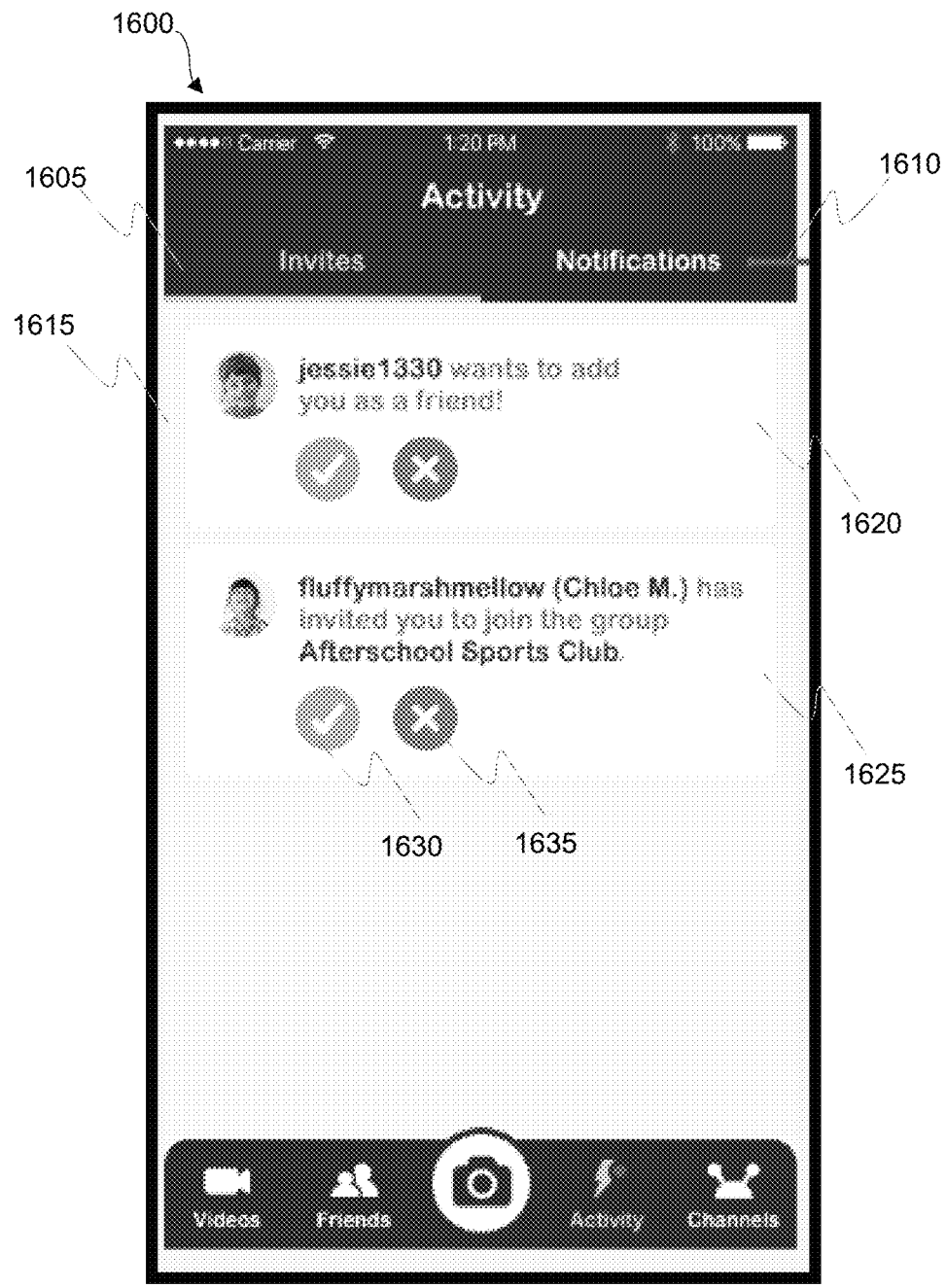
FIG. 16 depicts an exemplary on-screen user interface for displaying a user activity feed including open invitations according to embodiments of the present invention.
Figure 17:
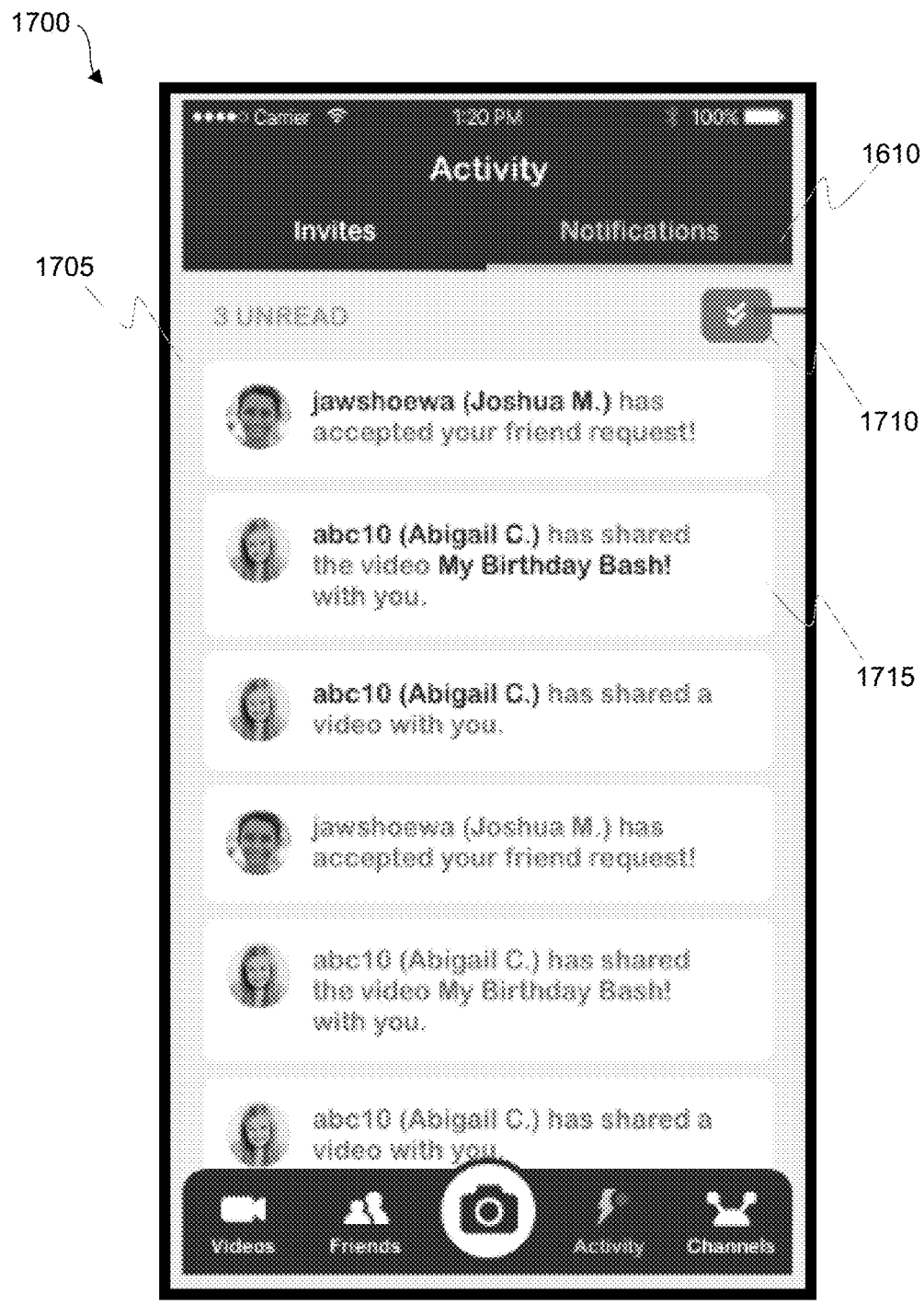
FIG. 17 depicts an exemplary on-screen user interface for displaying notifications to inform a user of recent activity associated with their account according to embodiments of the present invention.

As mentioned above with regard to FIG. 4, a user may navigate to an activity feed page using a navigation bar located at the bottom of the user interface. With regard to FIG. 16, an exemplary on-screen graphical user interface 1600 for displaying a user activity feed 1615 is depicted according to embodiments of the present invention. An invites tab 1605 and a notifications tab 1610 are used to navigate to invite activity and notification activity, respectively. For example, within the invites tab 1605, the activity feed 1615 can notify the user of a new friend request 1620 and a new group invitation 1625, and the user can accept the friend request by selecting the corresponding check mark (e.g., button 1630) or deny the friend request by selecting the corresponding "x" button (e.g., button 1635). If a request has previously been denied by the parent account, the request is not visible to the child account. As depicted in FIG. 17, according to embodiments of the present invention, when the notifications tab 1610 is selected, a list of notifications 1705 is displayed in a graphical user interface to inform the user of recent activity 1715 associated with their account in user interface 1700. The activity may include accepted friend requests, shared videos, etc. A mark-as-read button 1710 may be selected to clear the list of notifications 1705.

Child Profile and Social Activities

Figure 18:
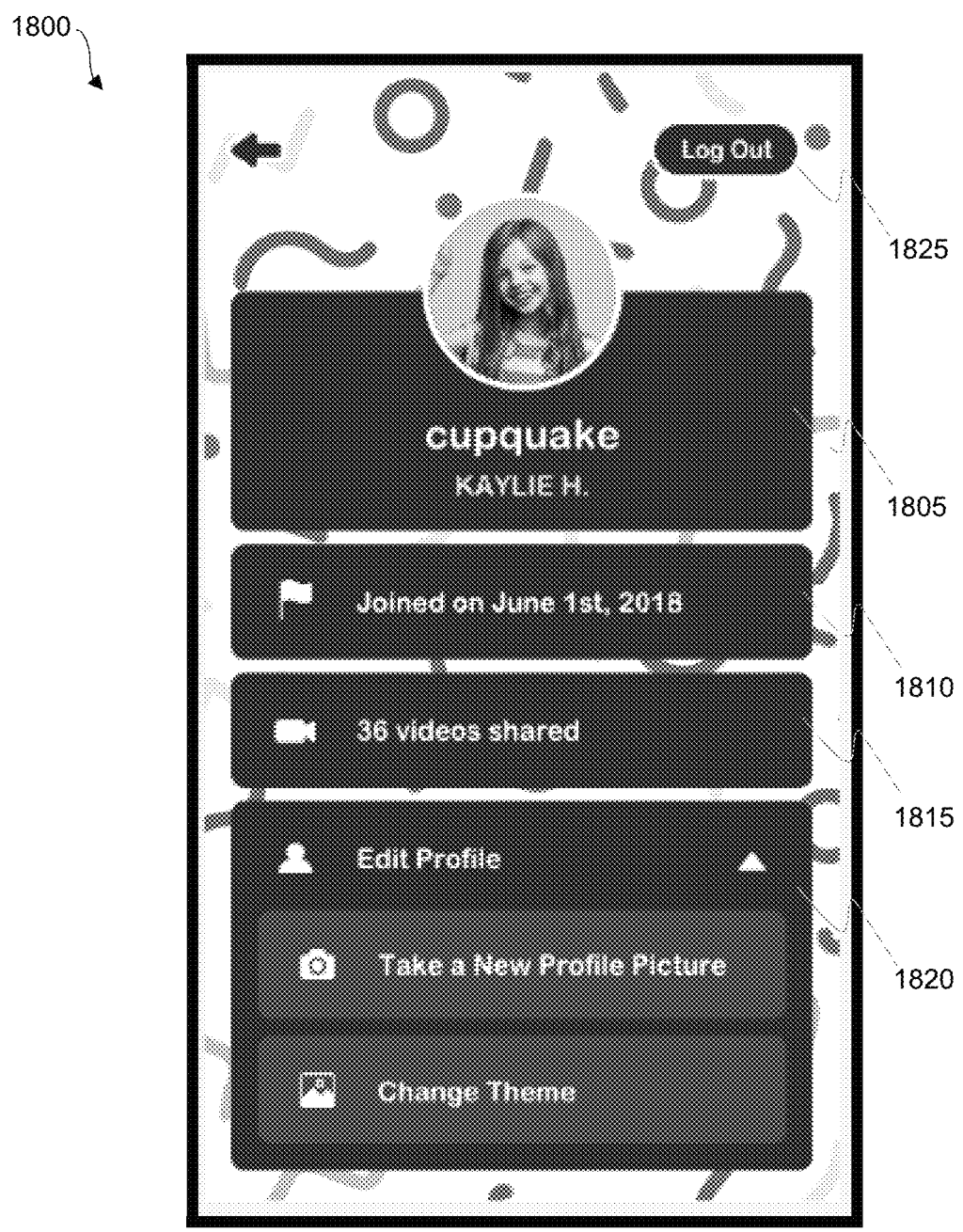
FIG. 18 depicts an exemplary on-screen user interface for displaying a child account profile according to embodiments of the present invention.

With regard to FIG. 18, an exemplary user interface 1800 displaying a child account profile is depicted according to embodiments of the present invention. The header 1805 of interface 1800 displays the current child account profile image, user name, first name and last initial, which were selected during an initial account creation process describe above. Below the header 1805, user interface 1800 displays the date the child account was created 1810 and the number of videos shared from the child account 1815. The edit profile window 1820 allows the child user to take a new profile picture and change the theme for their account profile page. The child user can also log out of their account using log out button 1825.

Figure 19:
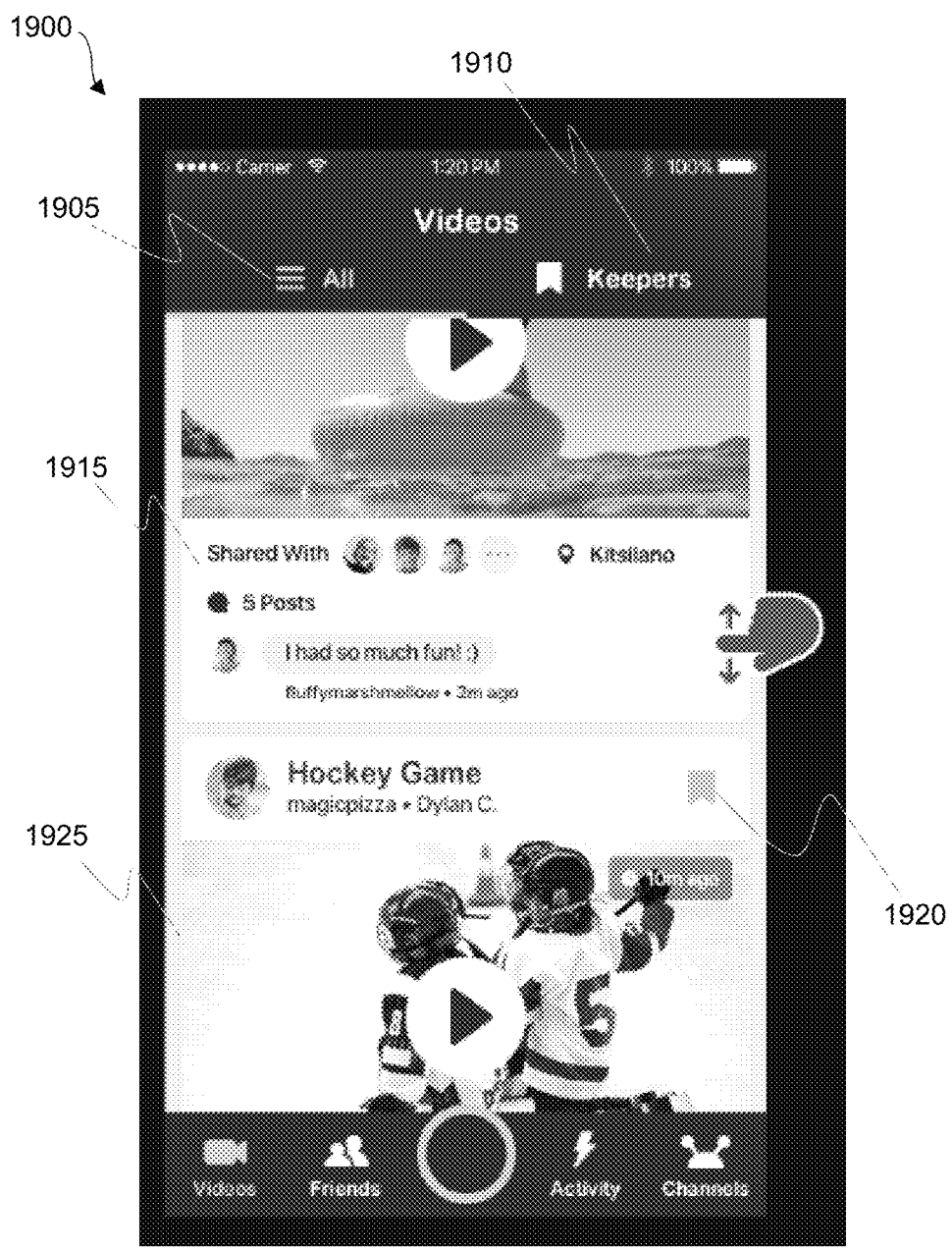
FIG. 19 depicts an exemplary on-screen user interface for displaying a video feed of a child account according to embodiments of the present invention.

With regard to FIG. 19, an exemplary on-screen user interface 1900 displaying a video feed of a child account is depicted according to embodiments of the present invention. The video feed may contain videos that friends have uploaded and may also contain videos from subscribed channels of the user. The user may select to view all of the videos in the feed using all videos tab 1905, and can view only keeper videos by selecting keepers tab 1910. A video may be saved as a "keeper" (e.g., a bookmark or favorite) by selecting keeper button 1920. The user interface 1900 also displays video details 1915, which may include who the video has been shared with, how many comments have been made, the location of the video, user comments, etc. A preview or thumbnail image 1925 is displayed for each video, and the video may be played by selecting the thumbnail image 1925. By selecting the video details 1915, a video details page is displayed as depicted by user interface 2000 in FIG. 20.

Figure 20:
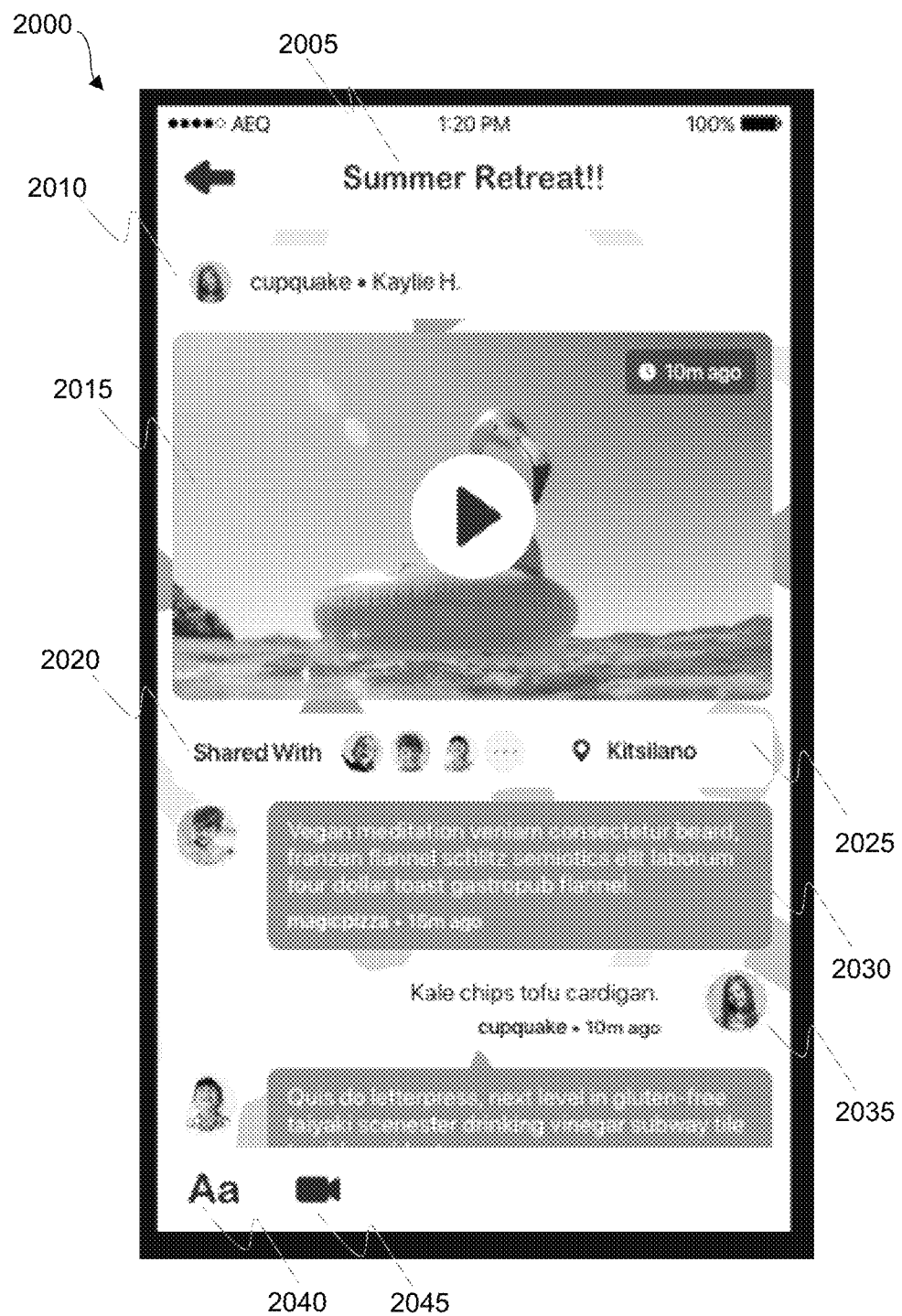
FIG. 20 depicts an exemplary on-screen user interface for displaying details of a video of a video feed according to embodiments of the present invention.

With regard to FIG. 20, an exemplary on-screen user interface 2000 for displaying video details is depicted according to embodiments of the present invention. The title of the video 2005 is displayed at the top of interface 2000, and the username, first name, and last initial of the video creator 2010 is displayed. The video details also include a video preview 2015, a list of accounts the video has been shared with 2020, a location of the video 2025, and a list of user comments 2030. Each user comment is associated with a user account 2035, and only comment contents from accounts that are friends with the child user are displayed to the child user. According to some embodiments, the comments of the video owner/creator are aligned on the right side of user interface 2000, and other comments are aligned to the left side of user interface 2000. According to some embodiments, when the commenter is not a friend of the user, only the commenter's profile picture and account name are displayed but not the comment. Each comment is tagged with a timestamp, and the most recent comment is displayed first.

Figure 22:
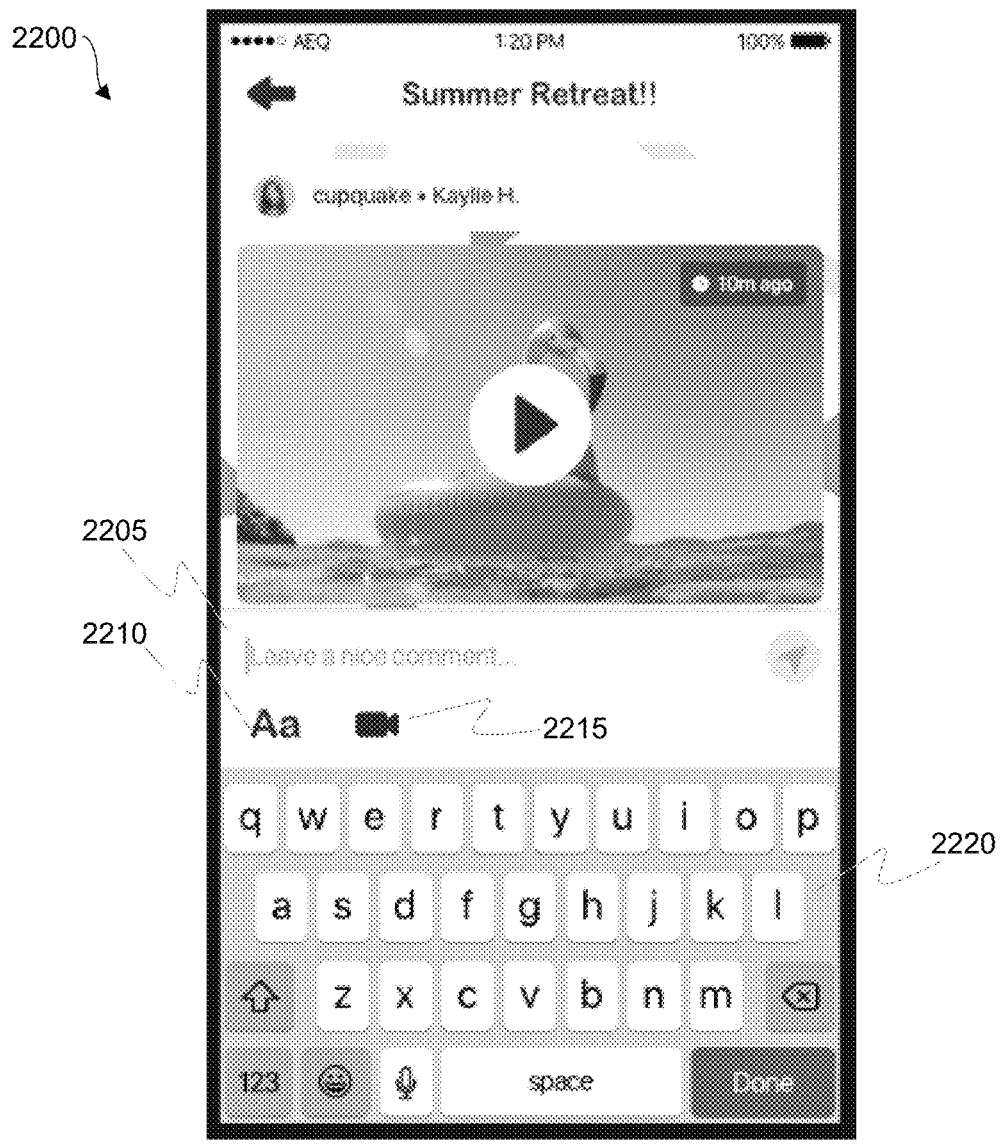
FIG. 22 depicts an exemplary on-screen user interface for entering a text comment in response to a shared video according to embodiments of the present invention.
Figure 23:
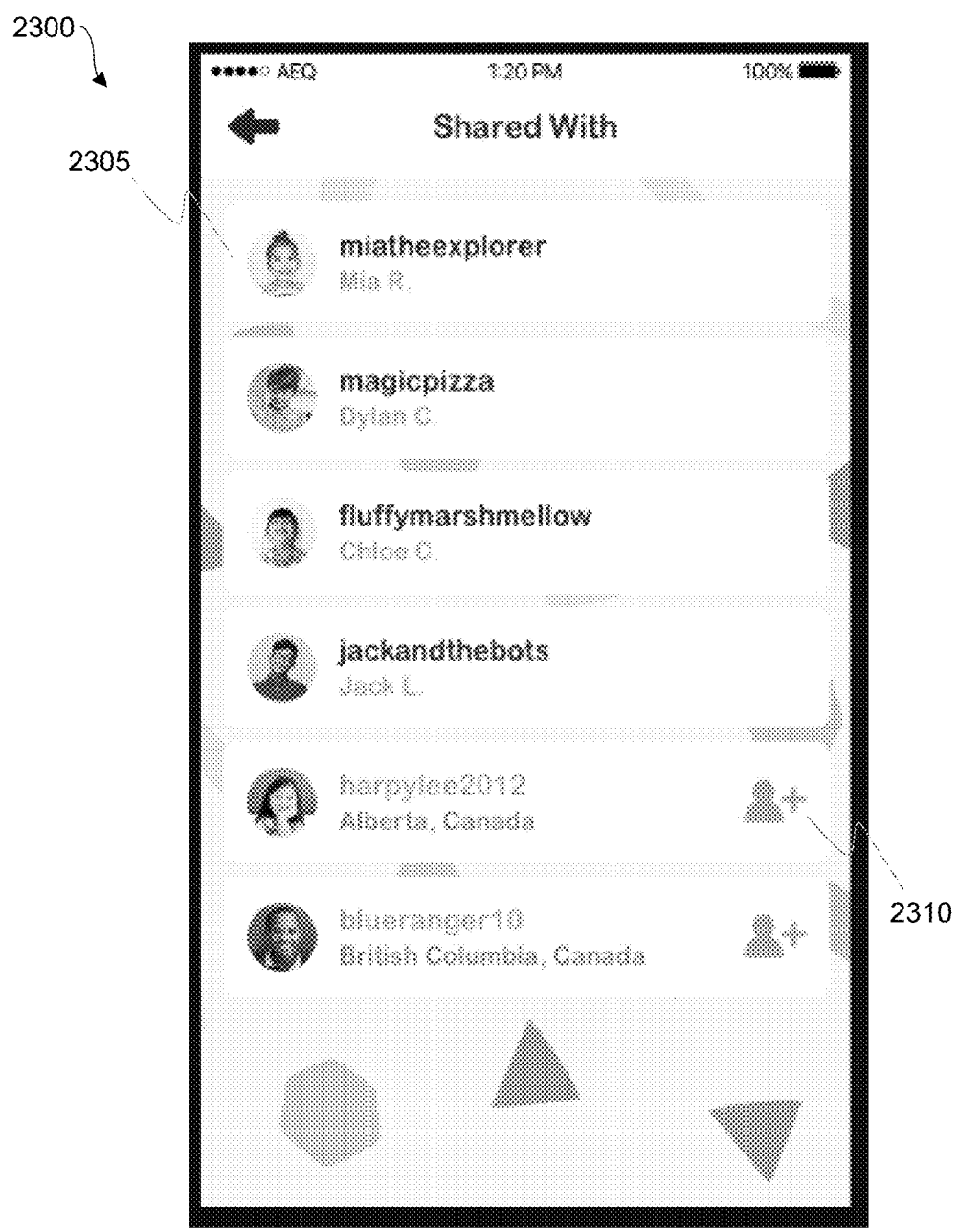
FIG. 23 depicts an exemplary on-screen user interface for displaying a video share list according to embodiments of the present invention.

The list of accounts the video has been shared with 2020 may be selected to show a "shared with" page (see FIG. 23). At the bottom of user interface 2000, comment button 2040 may be selected to enter a comment (e.g., a text comment) in response to the video (FIG. 22), and a video reply button 2045 for leaving a video reply in response to the video (FIG. 11). According to some embodiments, a video reply is limited to 20 seconds.

Figure 21:
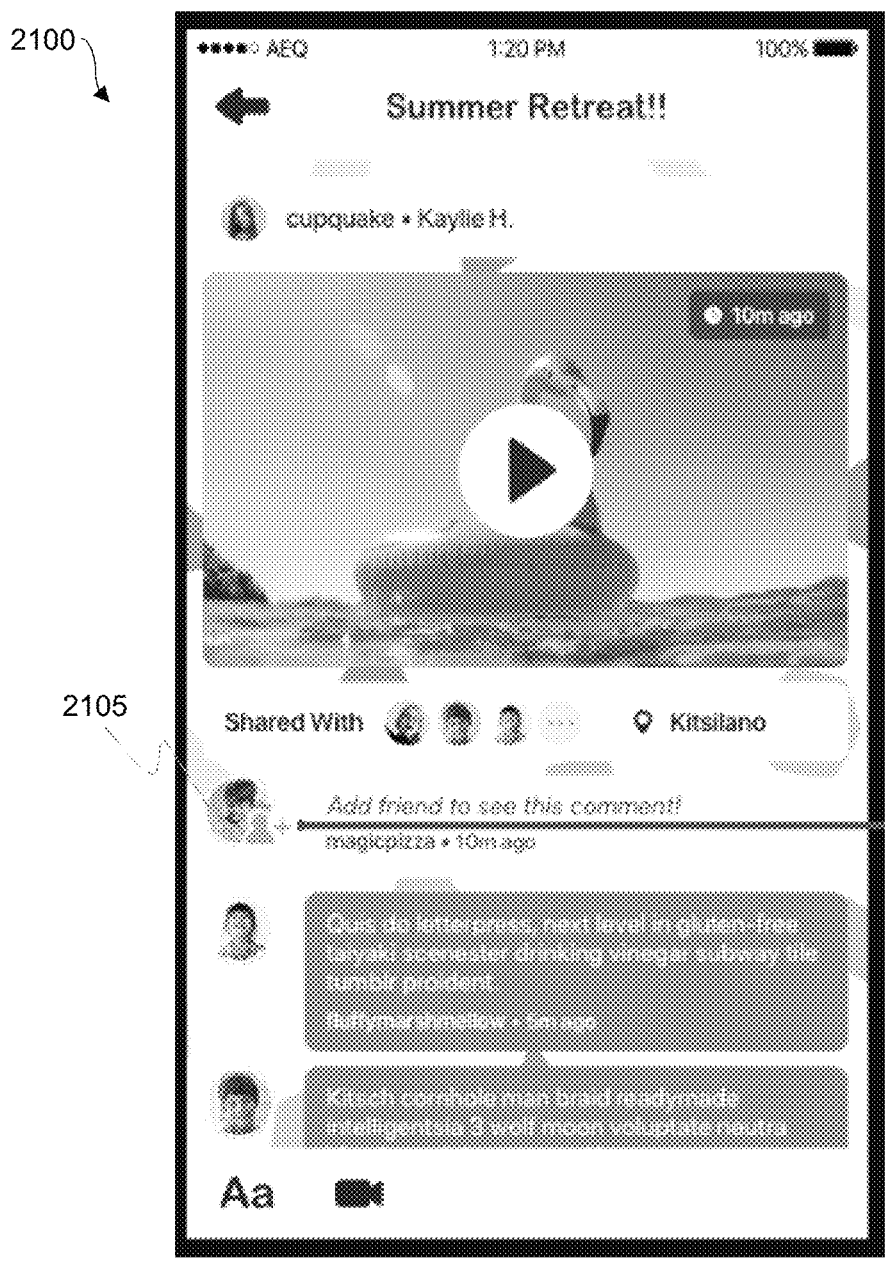
FIG. 21 depicts an exemplary on-screen user interface for displaying details of a video including a comment from a user account that is not friends with the user according to embodiments of the present invention.

With regard to FIG. 21, an exemplary on-screen graphical user interface 2100 for displaying video details is depicted according to embodiments of the present invention. Exemplary user interface 2100 in FIG. 21 is similar to exemplary user interface 2000 in FIG. 20; however, user interface 2100 includes a comment 2105 from an unknown or unapproved user account that is not friends with the child user. The content of the comment is not visible to the child user until both accounts are associated as friends. The child user may send a friend request to the unknown or unapproved user by selecting the comment 2105, and when the friend request is accepted, the content of the comment will be visible, assuming the associated parent account approves the friend request.

FIG. 22 depicts an exemplary on-screen user interface 2200 for entering a text comment in response to a shared video according to embodiments of the present invention. The user may enter a comment text by selecting comment text field 2205 and entering letters via keyboard interface 2220. Text comment mode and video comment mode may be toggled using comment button 2210 and video reply button 2215, respectively.

With regard to FIG. 23, an exemplary on-screen graphical user interface 2300 for displaying a video share list 2305 is depicted according to embodiments of the present invention. When a video has been shared with a user that is not friends with the current user, add friend button 2310 is displayed next to the user name and location. Selecting the add friend button 2310 sends a friend request to the corresponding user account. As described herein, the child account sending a friend request and the child account accepting a friend request may trigger separate notifications to the linked parent account for monitoring and/or authorizing the activity.

Branded Channel Content

Embodiments of the present invention enable third-party content providers to create video distribution channels within the child-based Social Networking platform described herein. The videos provided in a brand channel are added to the user's video feed and cannot be shared or commented on. According to some embodiments, the brand channel is actively managed to curate and/or approve content to be added to the brand channel for distribution. For example, advertisements may be provided to the brand channel for approval to display the advertisements on the brand channel. According to some embodiments, advertisements may be automatically provided to or suggested to the brand channel based on the content of the advertisement and/or user demographics associated with the brand channel.

Figure 24:
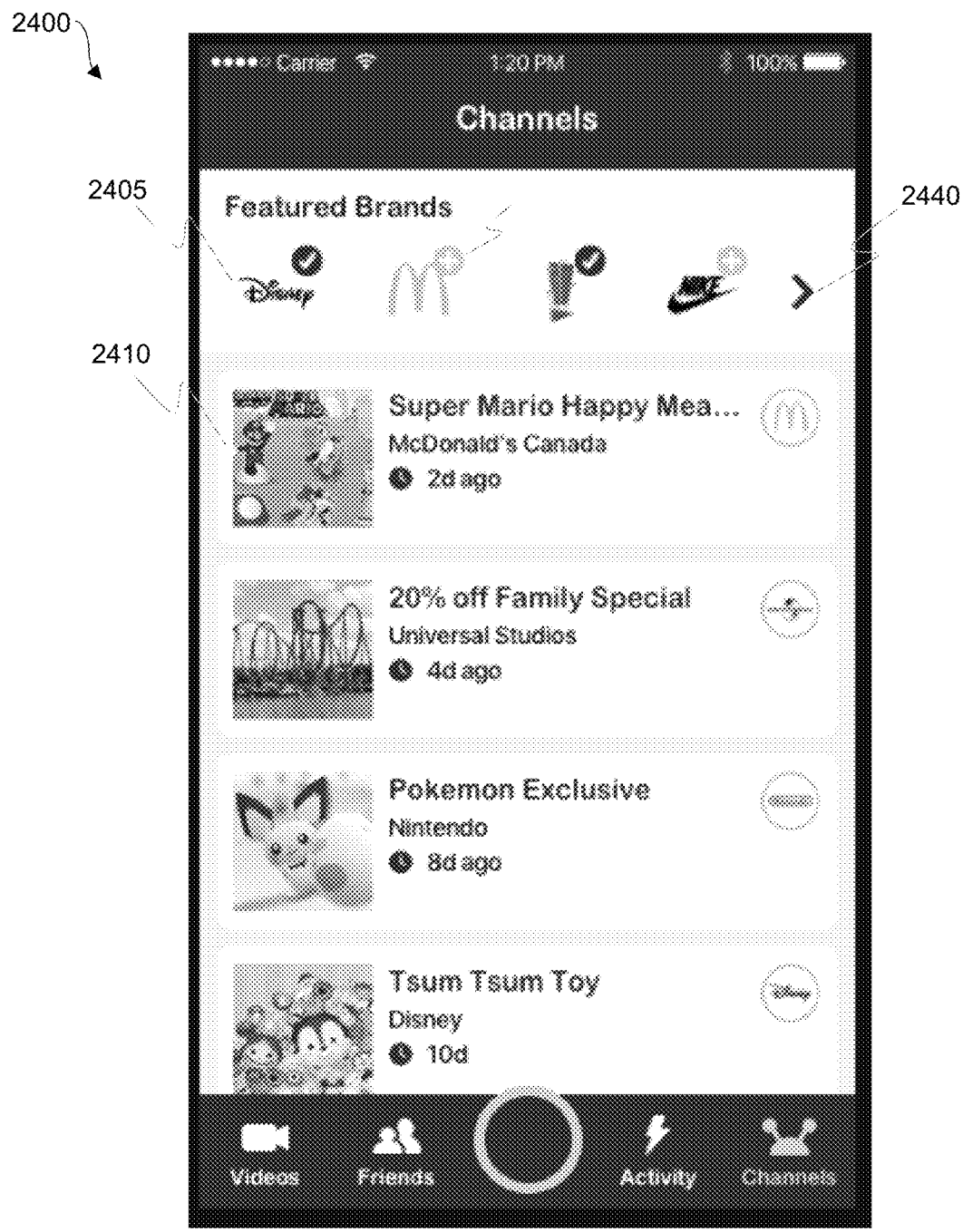
FIG. 24 depicts an exemplary on-screen displayed list of featured brands and brand channels according to embodiments of the present invention.

FIG. 24 depicts an exemplary on-screen graphical list of featured brands 2405 and brand channels 2410 according to embodiments of the present invention. By selecting the add brand button 2415, the user can add the videos provided in the brand's distribution channel to the user's video feed. The parent account associated with a child account can configure the child account to seek approval from the parent account before content of a brand channel is provided to the child's video feed by configuring the permissions of the child account using the parental control center described below with regard to FIG. 30. The user can view a full list of featured brands by selecting arrow button 2420. Some videos distributed via the brand channels may include advertisements for products and a link that can be selected to shop for and purchase the product. According to some embodiments, clicking on the link for the product will send a notification to the parent account or adds the product to a list (e.g., wish list).

Figure 25:
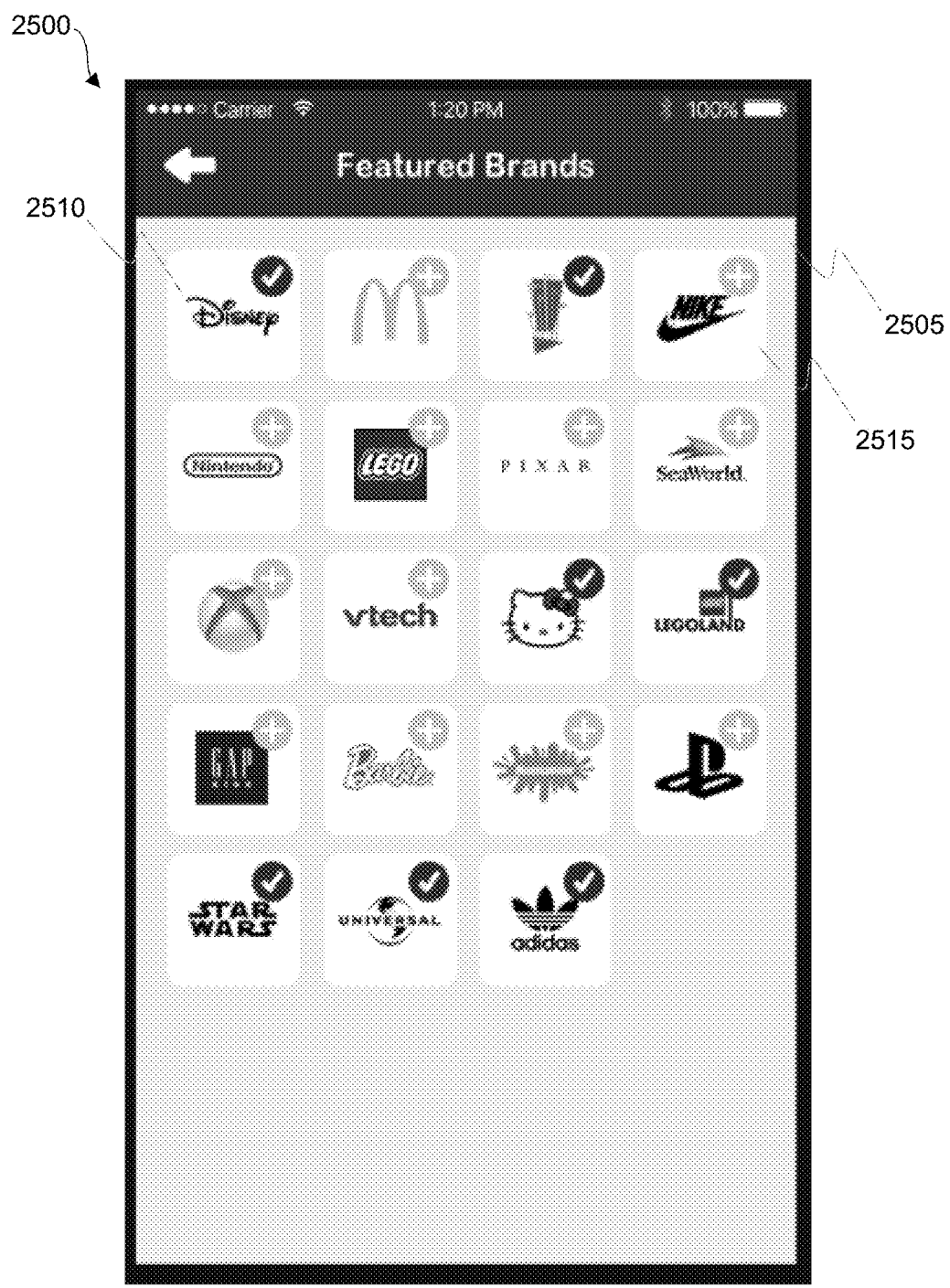
FIG. 25 depicts an exemplary on-screen display of a featured brands list for selecting brand channels to follow according to embodiments of the present invention.

With regard to FIG. 25, an exemplary on-screen graphical featured brands list 2505 is depicted according to embodiments of the present invention. Brands that have already been selected and added to the user's video feed are marked with a check mark 2510. New brands 2515 may be added to the user's video feed by selecting the brand. Based on the permissions of the child account, the new brands may require approval from an associated parent account before being are added to the child's video feed.

Parental Oversight and Controls

Embodiments of the present invention enable a parent account to view and control the Social Networking activity of associated child accounts. One or more child accounts can be associated with a parent account. For example, a parent account is able to view the activity of their child, set notifications based on their child's activity, set permission levels to control the activity of their child, set daily limits on their child's activities, and approve and deny requests from their child, such as requests to add friends, join groups, and add brand channels to their video feed, among other activities.

Figure 26:
FIG. 26 depicts an exemplary on-screen user interface of a parent account including a navigation bar displayed at the bottom of the user interface with a family button, an activity button, an approvals button, and a controls button according to embodiments of the present invention.
Figure 27:
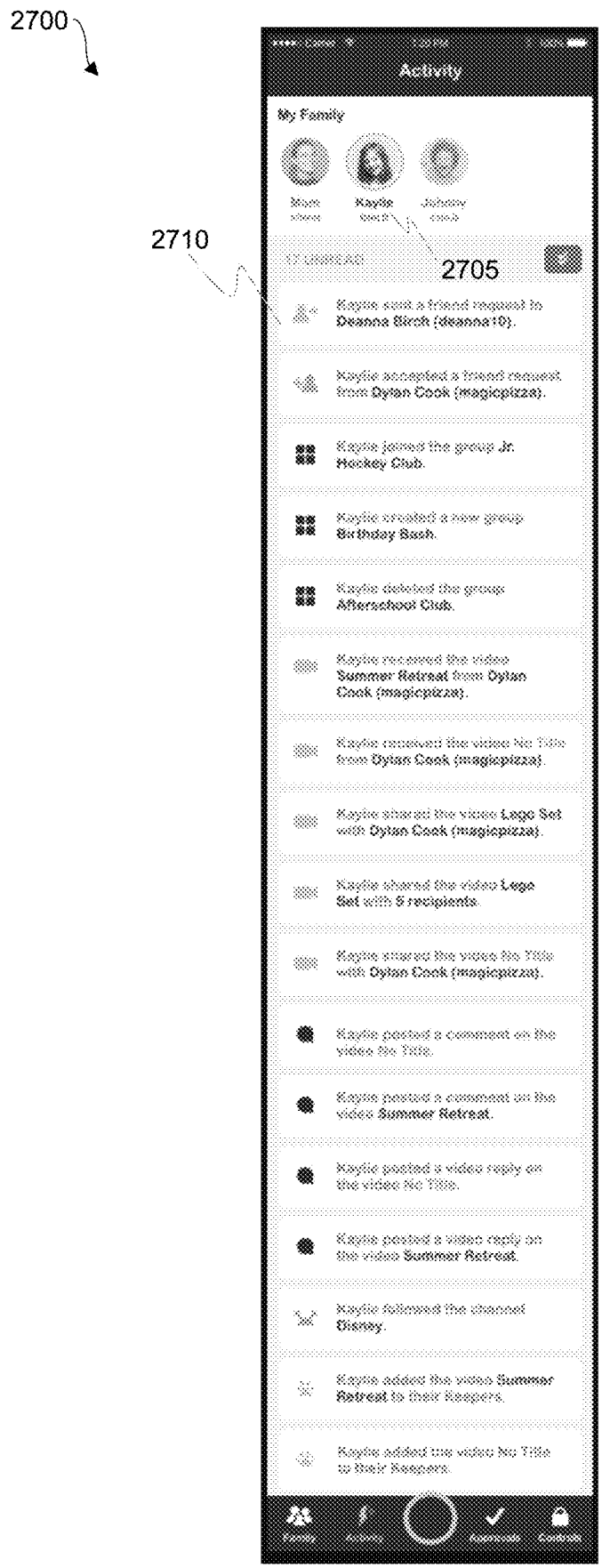
FIG. 27 depicts an exemplary on-screen user interface for displaying the content of an activity feed filtered to display only activities associated with a selected child account according to embodiments of the present invention.

When logged-in to a parent account, as depicted in FIG. 26 according to embodiments of the present invention, a navigation bar 2625 displayed at the bottom of the user interface includes family button 2630, activity button 2635, approvals button 2640, and controls button 2645. User interface 2600 depicted in FIG. 26 displays an activity feed responsive to a user selecting activity button 2635. When the parent account 2605 is selected, the activity feed displays the activity of all members of the family. To view the activity of a specific child, the child's profile picture 2610 or 2615 may be selected and the activity feed is filtered accordingly. The other items in the navigation bar 2625 are used to navigate to other pages within the parent account; for example, family button 2630 navigates to the home user group (e.g., My Family) (FIG. 10), activity button 2635 navigates to a family activity feed (FIG. 27), approvals button 2640 navigates to a family approvals page (FIG. 28), and control button 2645 navigates to a family control center (FIG. 29). As depicted in FIG. 27, according to embodiments of the present invention, when the selected account 2705 is a child account, the content of the activity feed 2710 is filtered to display only activity associated with the selected child account 2705. The activity feed is shown as a listing of discrete activities that can be scrolled up and down using well known graphical user interface buttons and techniques.

Figure 28:
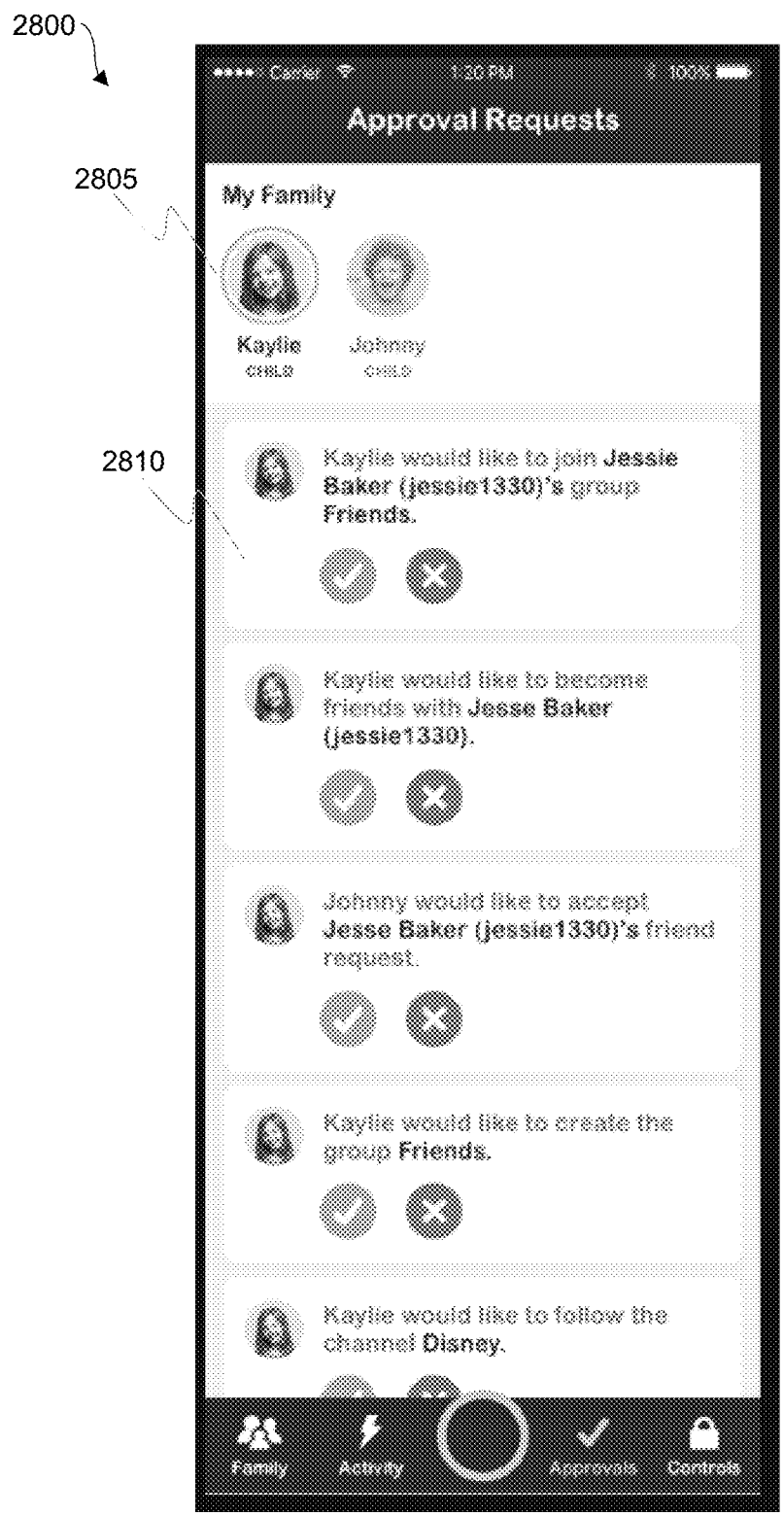
FIG. 28 depicts an exemplary on-screen user interface for providing parental approval to approval requests according to embodiments of the present invention.
Figure 29:
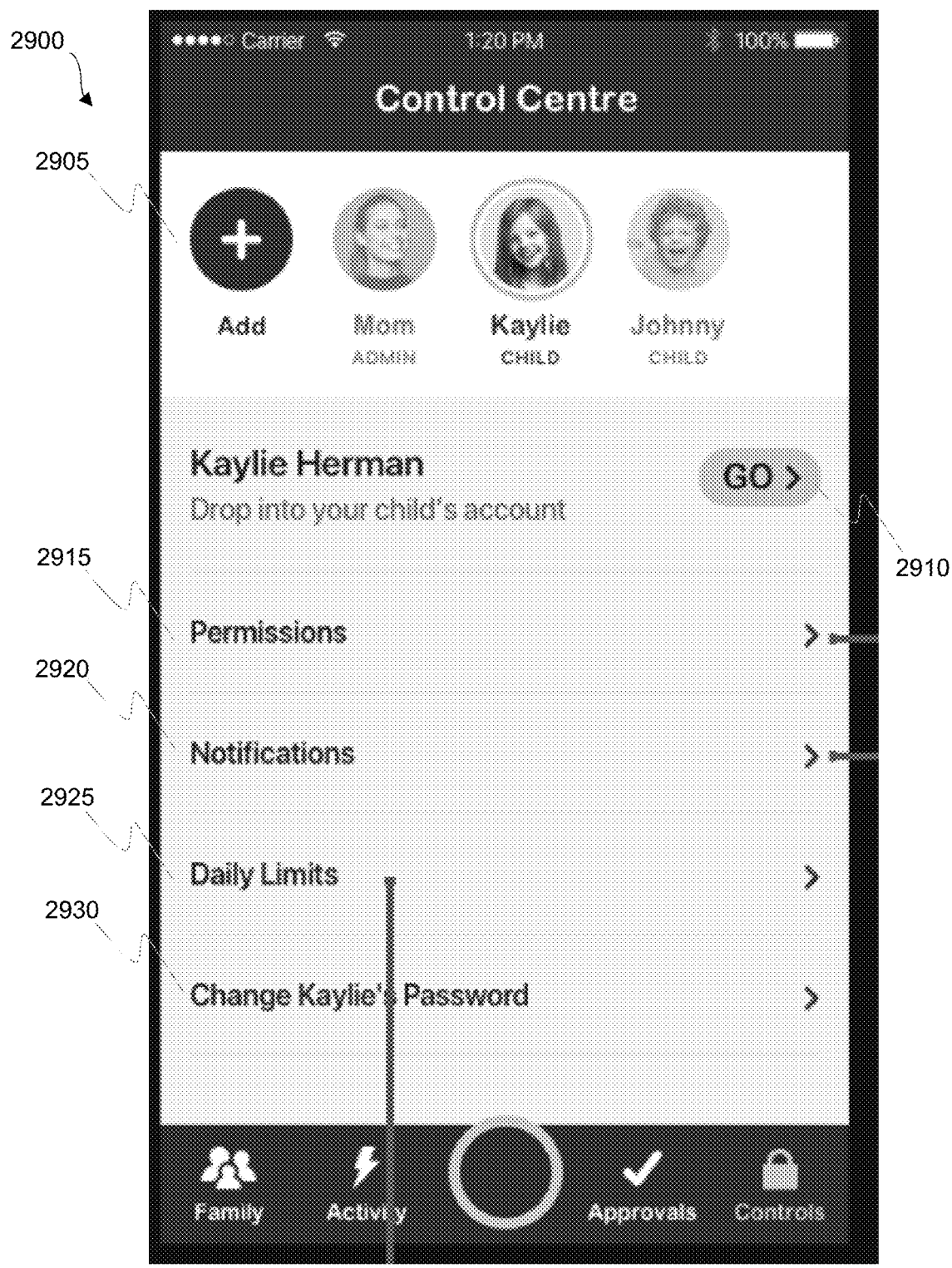
FIG. 29 depicts an exemplary on-screen user interface for controlling settings of a Social Networking account, such as permissions, notifications, daily limits, and passwords according to embodiments of the present invention.

With regard to FIG. 28, an exemplary on-screen graphical user interface 2800 for providing parental approval to approve requests is depicted according to embodiments of the present invention. The top portion of user interface 2800 includes an account selection window 2805 for selecting a child account 2805. The pending requests 2810 of the child account or displayed, and the parent user may selectively approve or deny the pending requests of the child account 2805. The types of requests that need approval can be set by the parent in the settings window of the parent account. For example, selecting the check mark to approve a request to join a group will add the selected child account to the group, and accepting a friend request will establish the child and the account corresponding to the request as friends. Other approval requests may include requests to add a brand channel to the child's video feed and to create new user groups, among others.

With regard to FIG. 29, an exemplary on-screen user interface 2900 for providing a user control interface is depicted according to embodiments of the present invention. The top portion of interface 2900 includes an account selection window 2905 for switching between existing accounts, such as child accounts associated with the parent (admin) account, and for adding new accounts, such as co-parent accounts or additional child accounts to be associated with the parent account. When a child account is selected, a drop-in button 2910 is displayed allowing the parent user to "drop-in" to the child account and view the content of the child account (see FIG. 31-34). The user control interface further provides options to configure permissions 2915 (FIG. 2), notifications 2920 (FIG. 30), daily limits 2925 (FIG. 3), and the password 2930 that is associated with the selected child account.

As described in more detail herein, by selecting the on-screen button 2910, the parent's display and entire user interface changes such that the parent can interface with the child's account as if the parent was directly using the child's account, e.g., as if the parent was directly logged-in to the child account. In this example, when button 2910 is selected, the parent's user interface will change such that Kaylie's account is accessible by the parent as if the parent was directly logged-in to Kaylie's account, with minor differences. For example, the interface displayed to the parent account does not include a record button, and an exit button is included that can be selected to stop accessing the child account. This is called the "drop-in" feature available to the parent account. The drop-in feature can be enabled to the parent account for any linked child account. During the drop-in mode, the child may not be aware that the parent has invoked the drop-in mode. That is to say, when the parent invokes the drop-in mode, this is transparent to the child account (assuming the parent is merely viewing content). The drop-in feature therefore provides a very strong supervisory function to the parent account concerning the activities and content of the child account and these functions are described in more detail herein. Moreover, in some embodiments, the parent account may watch any posted video content but is otherwise unable to interact with content of the child account. For example, in drop-on mode, the parent account is unable to record videos, leave comments or video replies on videos, add friends, add or change groups, clear notification lists, follow or unfollow new channels, etc.

Figure 30:
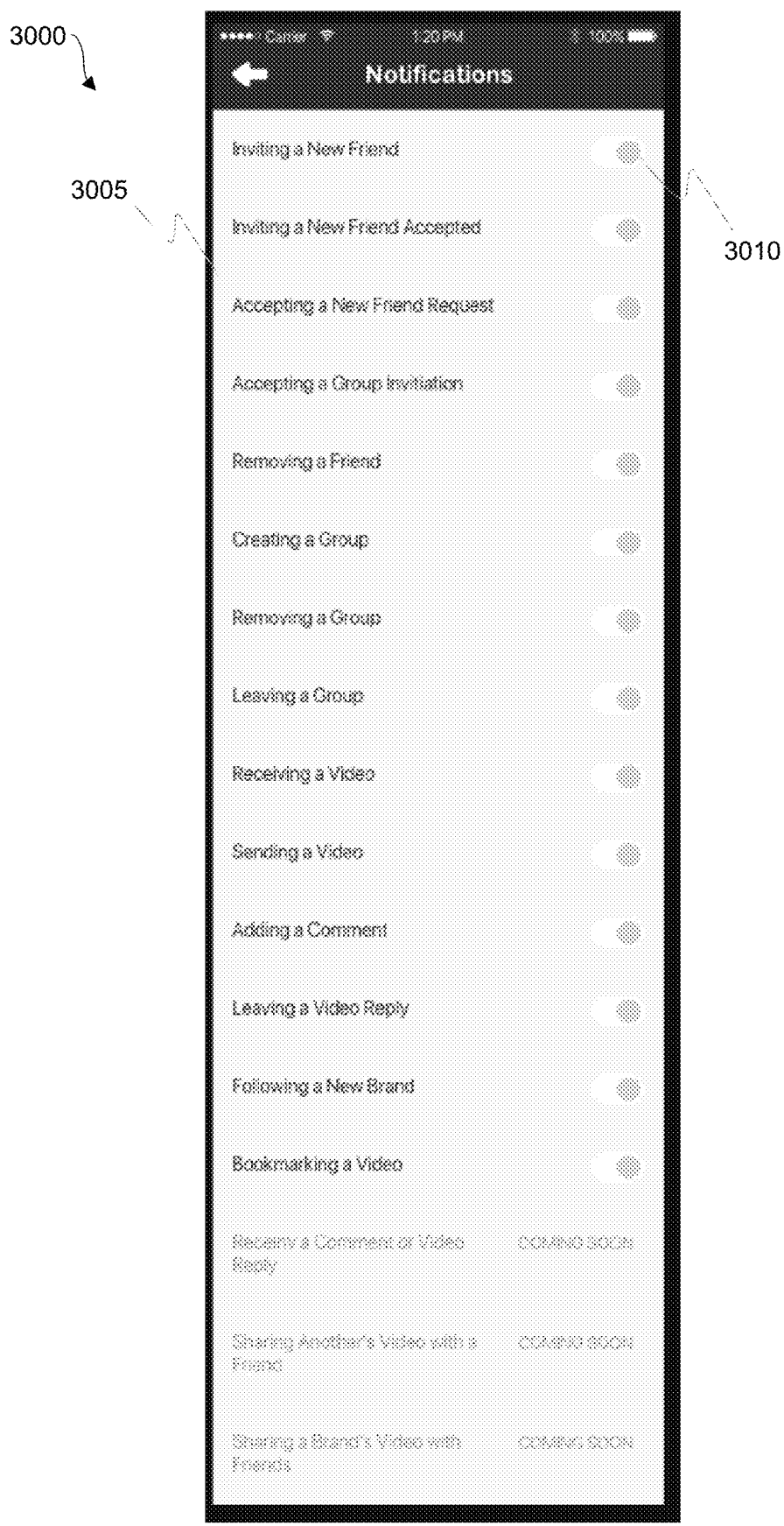
FIG. 30 depicts an exemplary on-screen user interface for configuring notification settings of a child account from an associated parent account according to embodiments of the present invention.

FIG. 30 depicts an exemplary on-screen graphical user interface 3000 for configuring notification settings 3005 of a selected child account using an associated parent account according to embodiments of the present invention. As described herein, the parent account can be automatically notified when certain activities are done to the child account. The configuring notification settings 3005 correspond to a toggle button (e.g., toggle button 3010) that may be switched on or off depending on the preference of the parent to add notification types. For example, the parent can configure the notification settings 3005 to push a notification to the parent account when the selected child account to perform certain activities such as sending a new friend invitation, becoming friends with a new user, becoming a member of a new group, removing a friend, creating a new group, removing a group, leaving a group, receiving a new video, sending a new video, adding a comment to a video, leaving a video reply to a video, following a new brand channel, and bookmarking a new video, among others notifications that can be enabled.

Notifications can also be established when the child account receives a notification of a new friend request or receives a new video.

Figure 31:
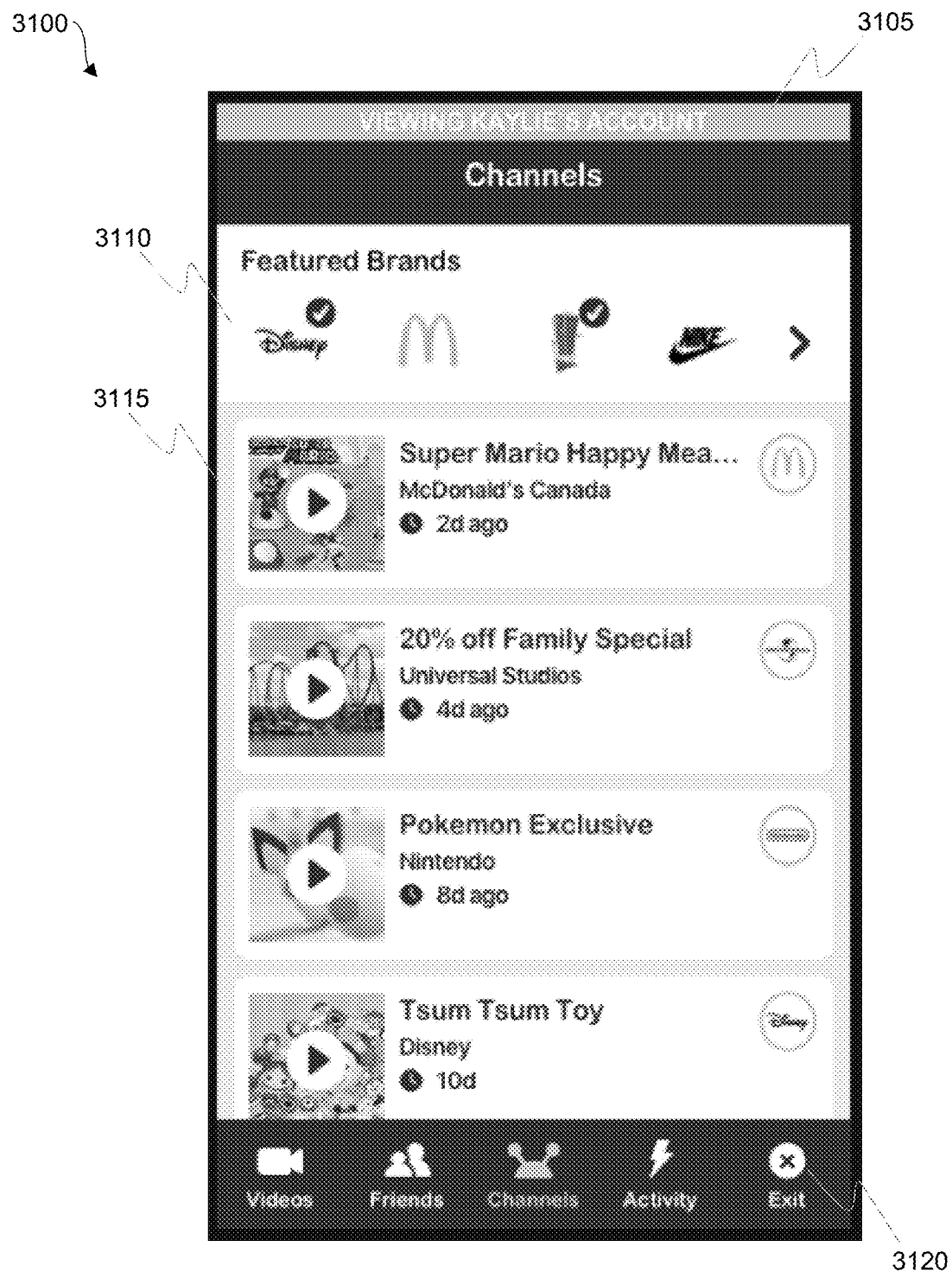
FIG. 31 depicts an exemplary on-screen drop-in interface of a parent account in drop-in mode for viewing brand channels followed by an associated child account according to embodiments of the present invention.

FIG. 31 depicts an exemplary on-screen graphical drop-in interface 3100 of a parent account for viewing brand channels followed by an associated child account according to embodiments of the present invention. A drop-in banner 3105 at the top of interface 3100 indicates that the parent is viewing a child account. When the drop-in feature is active, the parent account is able to view the content and activities of the associated child account (e.g., a mirror of the child account) as described above. Moreover, according to some embodiments, the parent account is unable to post new content or perform new activities when the drop-in mode is active. Furthermore, according to some embodiments, the parent account can activate the drop-in feature to access a mirrored copy of the child account for identifying and/or reporting any unwanted or inappropriate material visible to the child account so that the Social Networking platform can review and/or remove the content.

Figure 32:
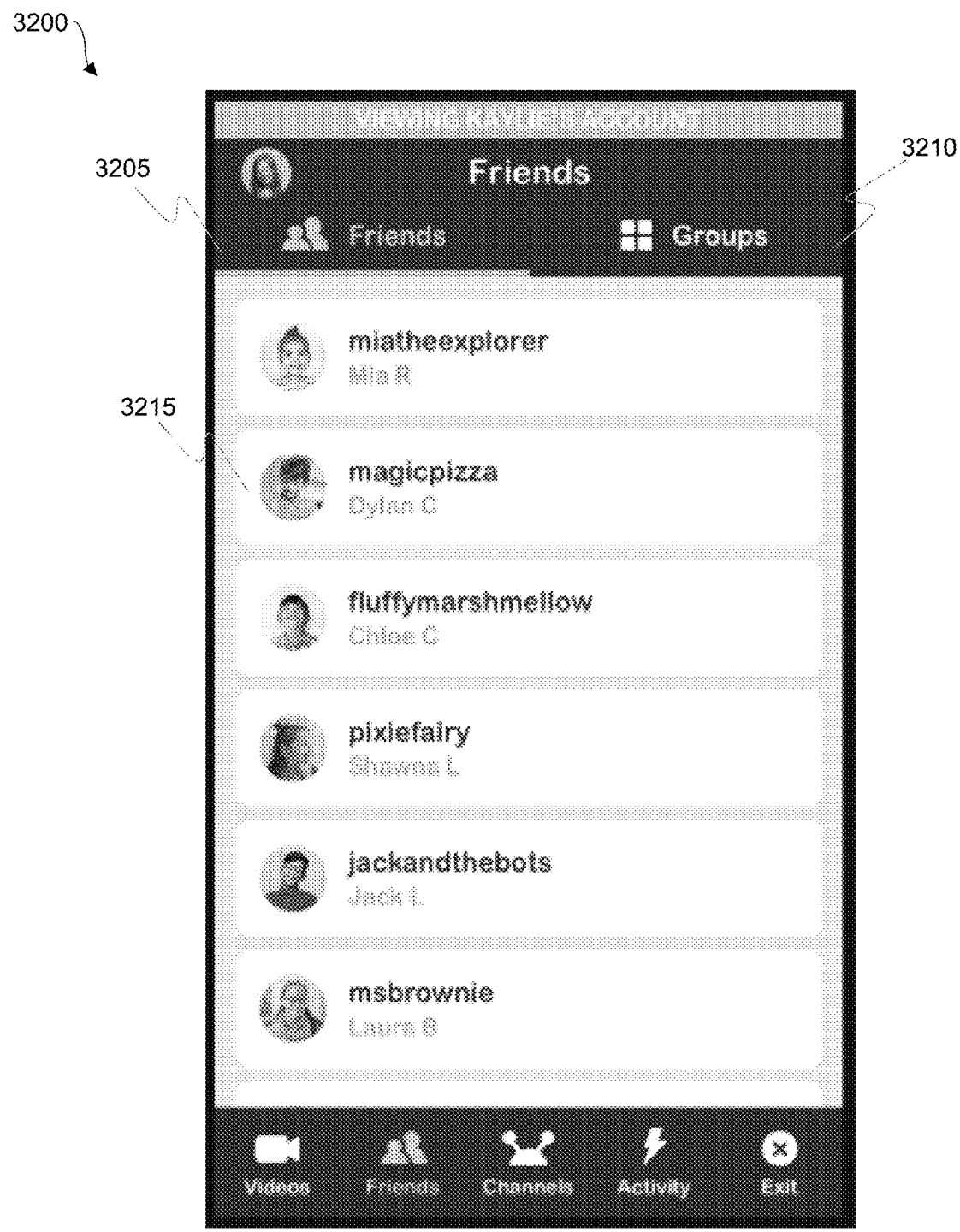
FIG. 32 depicts an exemplary on-screen drop-in interface of a parent account for viewing the friends and groups of an associated child account according to embodiments of the present invention.
Figure 33:
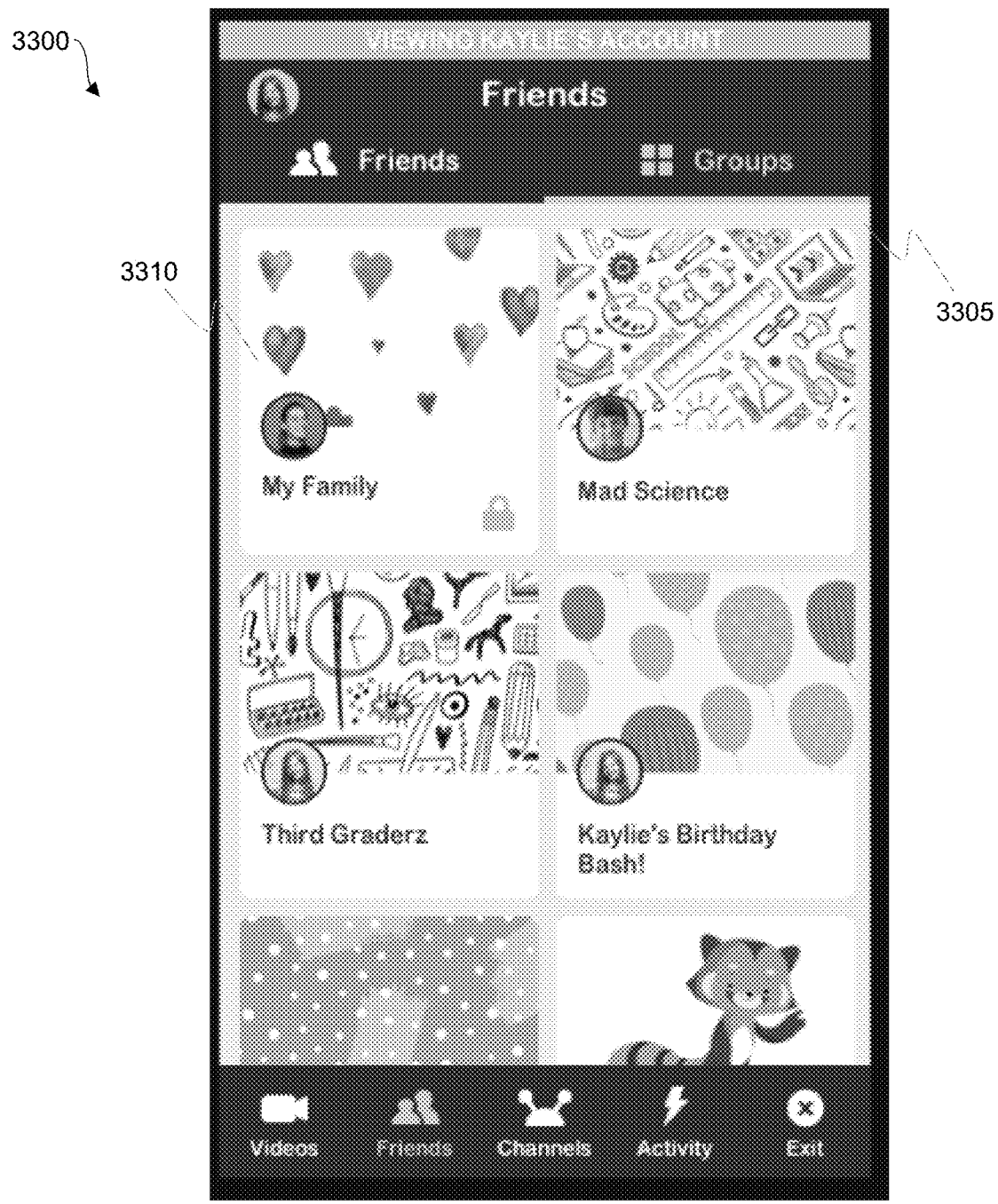
FIG. 33 depicts an exemplary on-screen user interface for displaying a list of groups of a child account in drop-in mode according to embodiments of the present invention.

The featured brands 3110 indicate which featured brands are followed by the child account, and a list of followed brands 3115 is displayed below the featured brands. An exit button 3120 may be selected to exit drop-in mode and return to the parent's account. Similarly, FIG. 32 depicts an exemplary on-screen graphical drop-in interface 3200 of a parent account for viewing the current friends and groups of an associated child account according to embodiments of the present invention. Friends tab 3205 and groups tab 3210 may be selected to toggle between viewing the child's friends and the child's groups, respectively. When the friends tab 3205 is selected, a current list of friends of the child account 3215 is displayed. As depicted in FIG. 33, according to embodiments of the present invention, when the groups tab 3210 is selected, user interface 3300 displays a current list of groups of the child account 3305. The first group displays is the child's home group (My Family) 3310, followed by other groups that the child user has joined.

According to some embodiments, the drop-in mode described herein includes functionality for reporting inappropriate or offensive material that has been shared on the Social Networking platform. For example, a user account, a video, or a comment may be indicated as offensive (e.g., by selecting a report button), and a report will be generated identifying the allegedly inappropriate material and sent to a Social Networking server for review.

Figure 34:
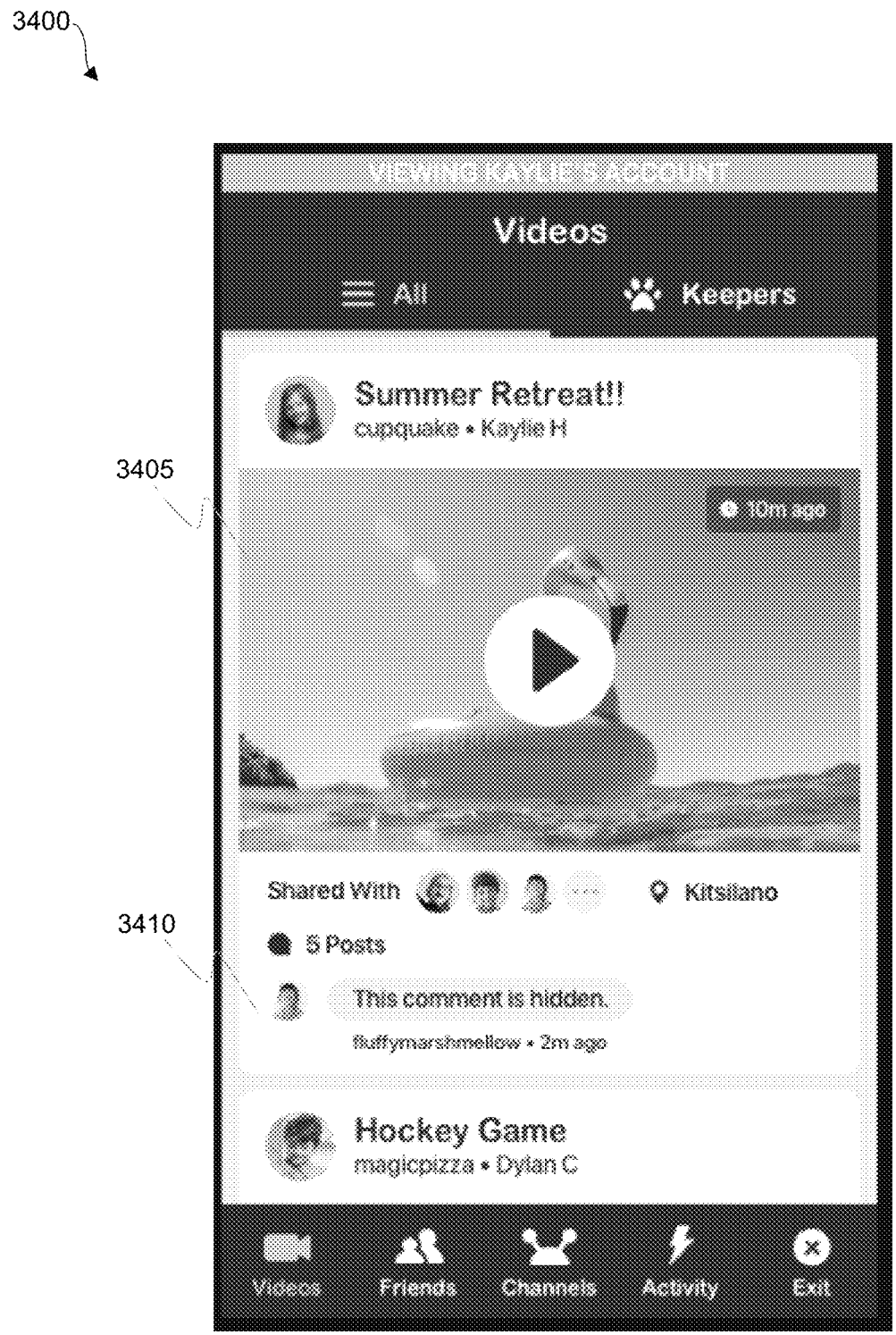
FIG. 34 depicts an exemplary on-screen user interface for viewing the videos of a child account from an associated parent account in drop-in mode according to embodiments of the present invention.

FIG. 34 depicts an exemplary on-screen graphical user interface 3400 for viewing the videos of a child account from an associated parent account in drop-in mode according to embodiments of the present invention. The video feed is displayed largely the same way as the video feed depicted in FIG. 19; however, the content of comments (e.g., comment 3410) is hidden and the parent user is unable to post new comments. By selecting video thumbnail 3405, the parent can watch the videos included in the child's video feed. It is to be appreciated that the parent account is unable to edit content or capture new videos while in drop-in mode. The parent can capture new videos and post the videos to their home group (My Family) when not in drop-in mode.

Exemplary Account Creation Process

Figure 35:
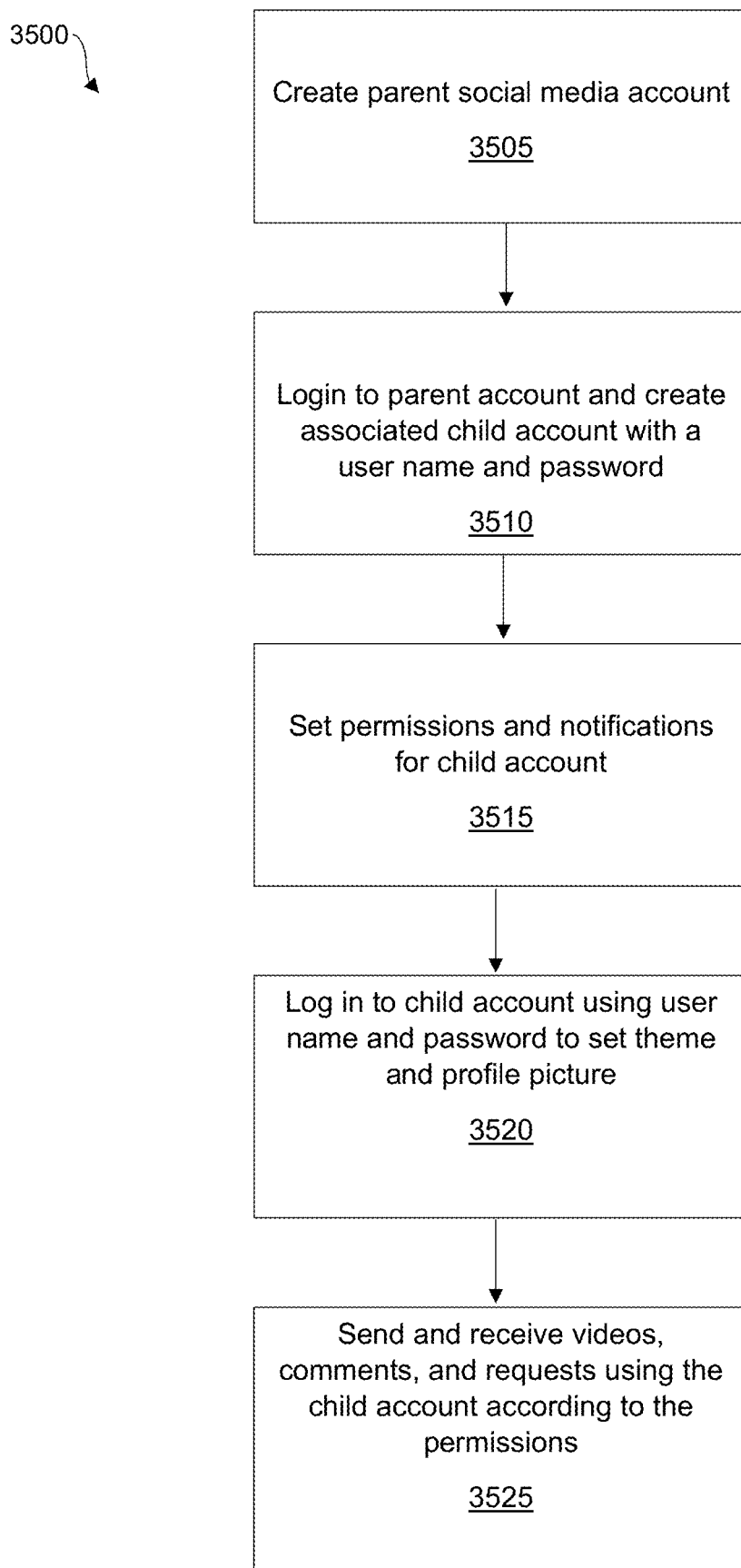
FIG. 35 depicts a flow chart of an exemplary sequence of computer-implemented steps for creating a parent Social Networking account and a child Social Networking account associated with the parent Social Networking account according to embodiments of the present invention, where the parent Social Networking account sets permissions and notifications for the child account.

With regard to FIG. 35, a flow chart 3500 of an exemplary sequence of computer-implemented steps for creating a parent Social Networking account and a child Social Networking account associated with the parent Social Networking account according to embodiments of the present invention, where the parent Social Networking account establishes permissions and sets notifications for the child account. At step 3505, the parent user creates a new Social Networking account with a user name and password. At step 3510, the parent user logs-in to their account and creates a child account with a different user name and password, and the child account becomes associated with the parent account. At step 3515, the parent account is used to set permissions for the child account, such as permission to add new friends, accept a friend request, create a new group, accept a group request, follow a new brand channel, delete a group, or create a new group, for example. At step 3520, the child user logs into their account and configures their account by selecting an account theme and a profile picture. At step 3525, the child user sends and receives (e.g., shares) videos, comments, and requests from other uses using the child account according to the permissions and approval of the parent account. For example, step 3525 may include performing one or more of the steps depicted in flow chart 3600 of FIG. 36, such as Receiving an authorization request at a parent account associated with the child account (3610), responding to the authorization request from the parent account to approve the invitation (3615), and executing the invitation based on the authorization (3620).

Exemplary Request Authorization Process

Figure 36:
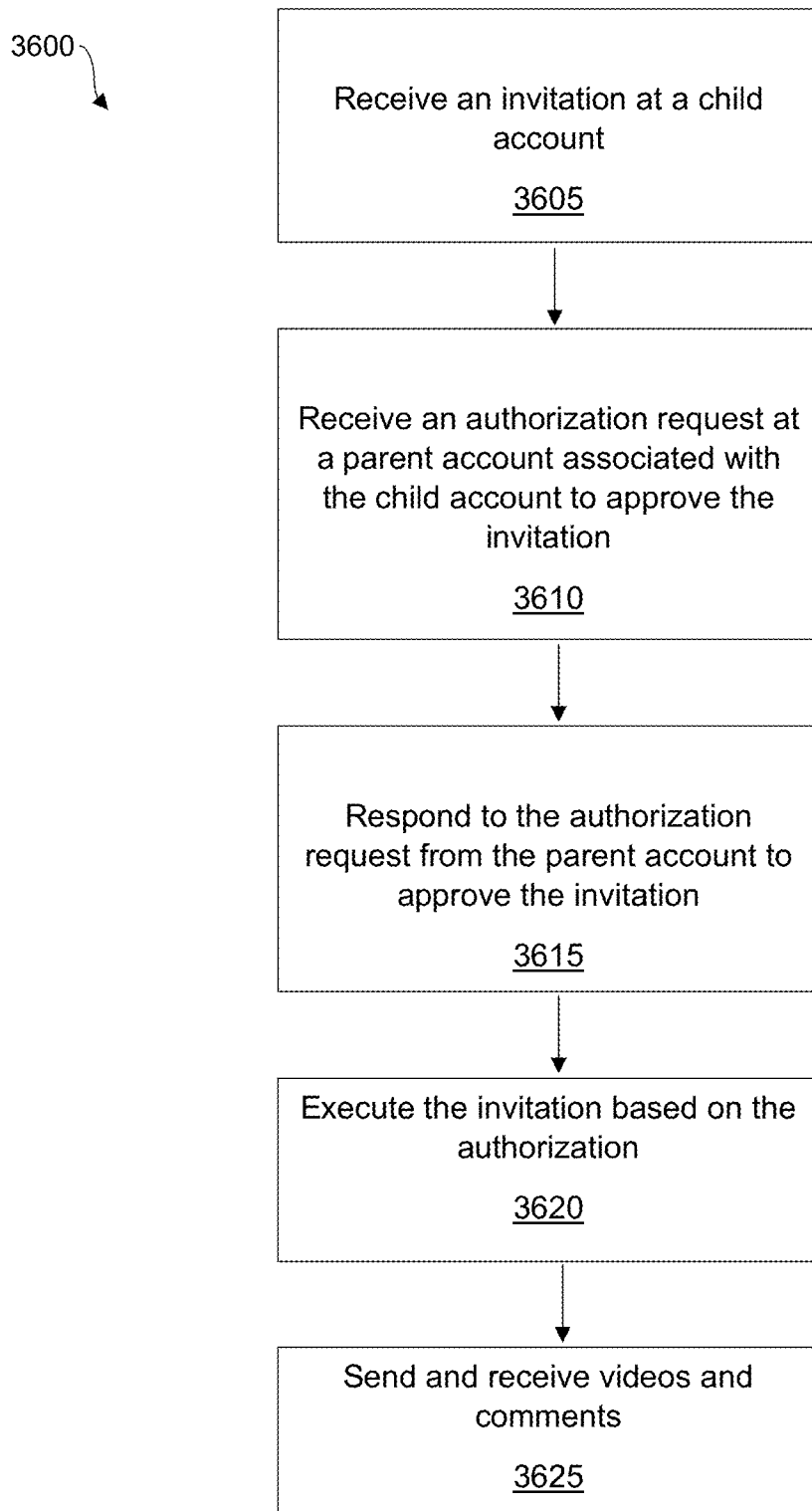
FIG. 36 depicts a flow chart of an exemplary sequence of computer-implemented steps for approving an invitation for a child account using a parent account associated with the child account according to embodiments of the present invention.

FIG. 36 depicts a flow chart of an exemplary sequence of computer-implemented steps 3600 for approving an invitation of a child account using a parent account associated with the child account according to embodiments of the present invention. At step 3605, an invitation is received at a child account, for example, from an unknown or unapproved user, or from a group of which the child user is not a member. At step 3610, the parent account associated with the child account receives an authorization request to approve the invitation. At step 3615 the parent responds to the authorization request. The parent may deny the authorization request, ending the authorization process. When the parent approves the authorization request at step 3615, the invitation is executed at step 3620. The invitation may include an invitation to join a group or connect as friends, for example. When the invitation is executed, the child user becomes a member of the group or connects to the user as a friend, and the unapproved/unknown user becomes an approved user (e.g., friend). At step 3625, the child user sends and/or receives videos and comments with the approved user or group.

Exemplary Computer System and Social Networking Platform

Embodiments of the present invention are drawn to computer systems for providing and accessing a Social Networking platform. The following discussion describes such exemplary computer systems. In general, the system described in FIG. 37 may pertain to a server executing aspects of the Social Networking platform and/or remote client systems (e.g., mobile computers) used by parents or children.

Figure 37:
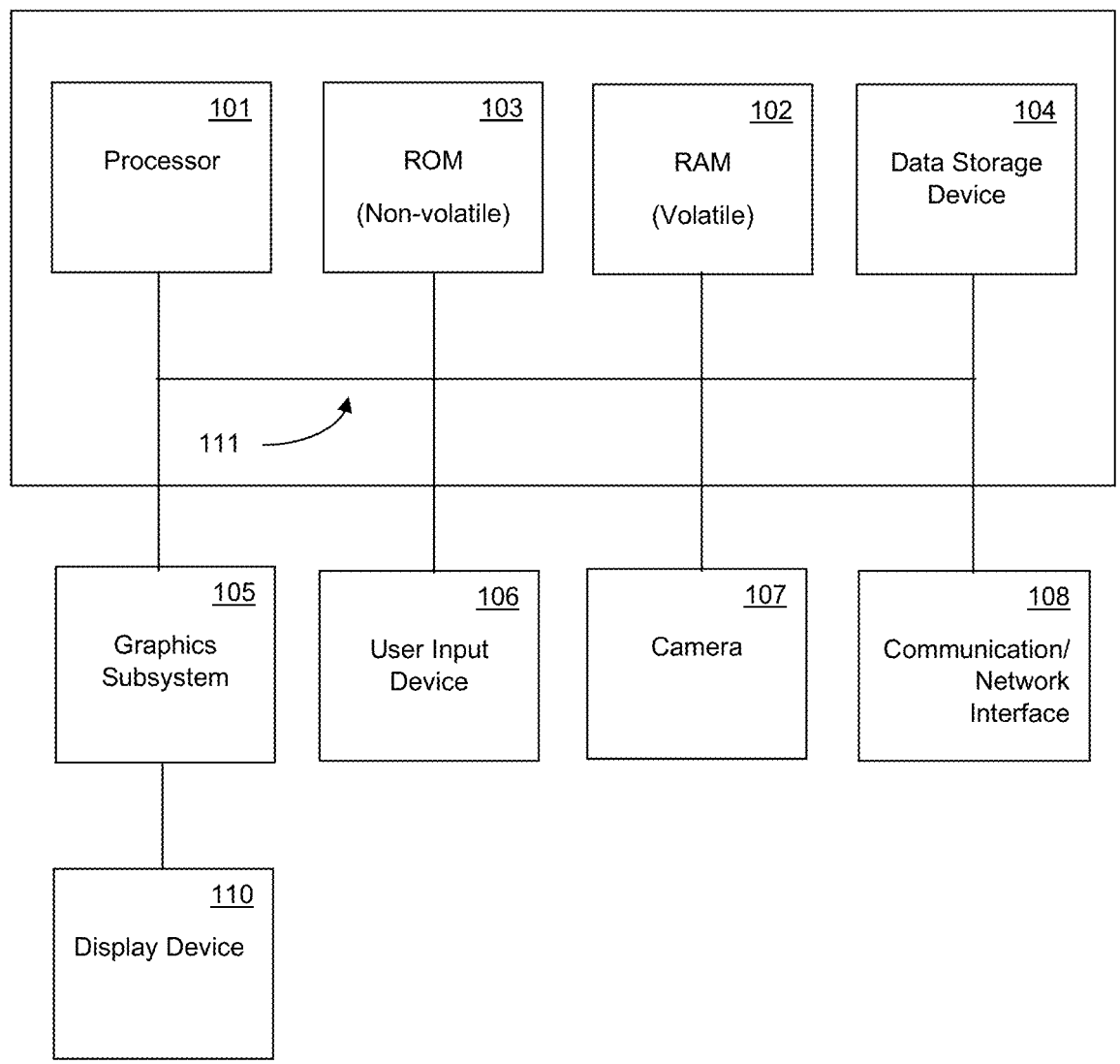
FIG. 37 depicts an exemplary computer system upon which embodiments of the present invention may be implemented.

In the example of FIG. 37, the exemplary computer system 112 includes a central processing unit (CPU) 101 for running software applications (e.g., 3D application 117) and optionally an operating system. Random access memory 102 and read-only memory 103 store applications and data for use by the CPU 101. Data storage device 104 provides non-volatile storage for applications and data and may include fixed disk drives, removable disk drives, flash memory devices, and CD-ROM, DVD-ROM or other optical storage devices. The optional user inputs 106 may comprise devices that communicate inputs from one or more users to the computer system 112 (e.g., mice, joysticks, touch screens, and/or microphones). According to some embodiments, computer system 112 is a server configured to store Social Networking content and/or enable users to communicate and share Social Networking content with friends.

A communication or network interface 108 allows the computer system 112 to communicate with other computer systems, networks, or devices via an electronic communications network, including wired and/or wireless communication and including an Intranet or the Internet. The display device 110 may be any device capable of displaying visual information in response to a signal from the computer system 512 and may include a flat panel touch sensitive display, for example. The components of the computer system 112, including the CPU 101, memory 102/103, data storage 104, user input devices 106, and graphics subsystem 105 may be coupled via one or more data buses 111.

In the embodiment of FIG. 37, a graphics subsystem 105 may be coupled with the data bus and the components of the computer system 112. The graphics system may comprise a physical graphics processing unit (GPU) 113 and graphics/video memory. GPU 113 may include one or more rasterizers, transformation engines, and geometry engines, and generates pixel data from rendering commands to create output images. The physical GPU 113 can be configured as multiple virtual GPUs that may be used in parallel (e.g., concurrently) by a number of applications or processes executing in parallel, or multiple physical GPUs may be used simultaneously. Graphics subsystem 105 can output display data to display device 110.

According to some embodiments, the exemplary computer system 112 is a client device for performing Social Networking-related activities such as capturing and sharing videos with friends. In the example of FIG. 37, computer system 112 includes a camera 107 used to capture photos and videos, and the videos may be shared over network interface 108, for example, with members of a Social Networking network. The photos and videos captured by camera 107 may also be stored in the computer system 112 in RAM 102 or data storage device 104. The camera 107 may include multiple cameras, such as a front facing camera and a rear facing camera, and may further include one of more light sources for producing a flash to illuminate a scene that is captured by the camera 107.

Some embodiments may be described in the general context of computer-executable instructions, such as program modules, executed by one or more computers or other devices. Generally, program modules include routines, programs, objects, components, data structures, etc. that perform particular tasks or implement particular abstract data types. Typically the functionality of the program modules may be combined or distributed as desired in various embodiments.

Figure 38:
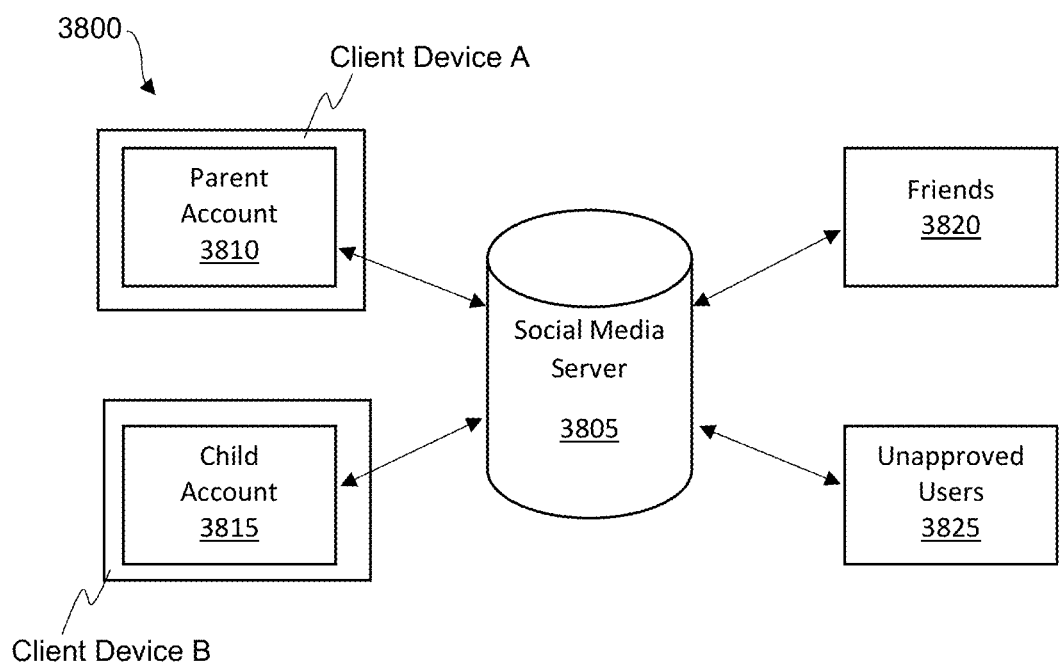
FIG. 38 depicts an exemplary Social Networking platform including a parent account and a child account running on client devices and a Social Networking server according to embodiments of the present invention.

With regard to FIG. 38, an exemplary Social Networking platform 3800 (e.g., computer system 112 depicted in FIG. 37) is depicted according to embodiments of the present invention. Social Networking Server 3805 is configure to store Social Networking content, such as videos, comments, relationships between users, user settings, permissions, etc., and communicates with a parent account 3810, a child account 3815, friends of the child account 3820, and unapproved users 3825 to provide Social Networking services described herein.

The parent account 3810 and the child account 3815 may be logged in on the same client device or separate client devices. In the example of FIG. 38, parent account 3810 is logged in to client device A, and the child account 3815 is logged in to client device B. As described above according to embodiments of the present invention, the child account 3815 is created using parent account 3810, and the accounts are associated such that the parent account 3810 can set permissions of the child account 3815, receives notifications regarding the activity of child account 3815, and can "drop-in" to the child account to view content of the child account directly.

Child account 3815 may join groups and connect with friends to share comments and videos based on the permission level set by the parent account 3810, and these activates may require approval of the parent account 3810. Unapproved users 3825 are unable to share videos with child account 3815. According to some embodiments, unapproved users 3825 are able to comment on videos that can be seen by the child account 3815, but the content of the comment is hidden.

Figure 39:
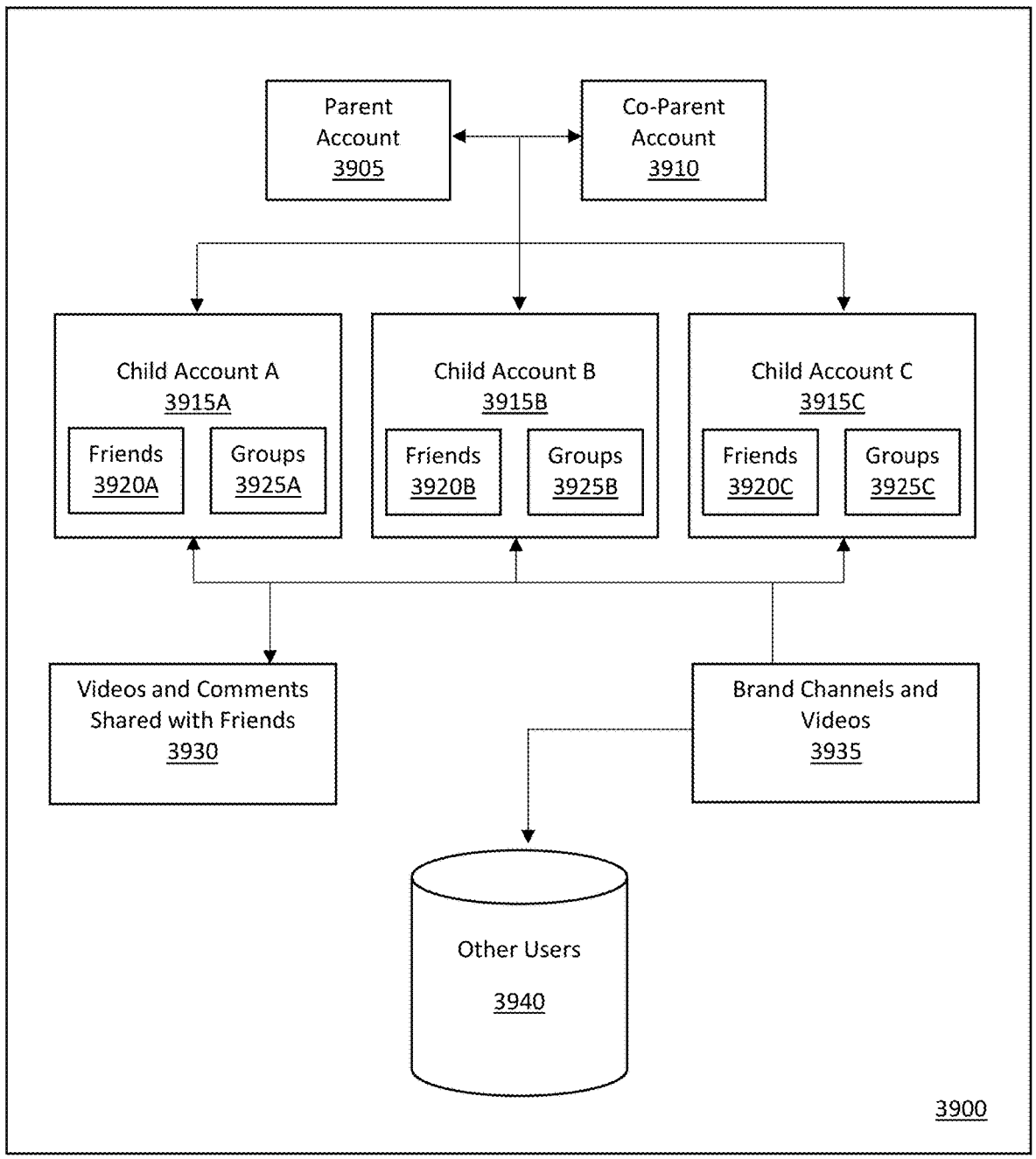
FIG. 39 is a block diagram and data flow diagram depicting an exemplary flow of data for providing Social Networking services depicted according to embodiments of the present invention.

With regard to FIG. 39, a block diagram and data flow diagram 3900 depicting an exemplary flow of data for providing Social Networking services is depicted according to embodiments of the present invention. Parent account 3905 and optional co-parent account 3910 are associated with child accounts 3915A, 3915B, and 3915C. As described herein, parent account 3905 sets permission and notification settings for the associated child accounts (e.g., child account 3915A, 3915B, and 3915C). For example, the parent account may configure a child account such that a notification is received when the child receives a new friend request, is added to a group, etc. Furthermore, the parent account may be used to configure an associated child account such that the consent of the parent account is required before certain Social Networking activities may be performed by the child account, such as adding a new friend (e.g., accepting a friend request or sending a new friend request) or creating a group.

Each child account is linked to a list of friends (e.g., friends 3920A, 3920B, and 3920C) and groups of friends (e.g., groups 3925A, 3925B, 3925C). Videos and video comments 3930 that have been shared with friends are provided to users (e.g., child account 3915A, 3915B, and 3915C) as described herein. For example, the shared videos may be rendered in a video feed of the respective child account. Brand channels and related videos 3935 are accessible to the child account based on which brands the respective child account is following. Other users 3940 who are not friends with child account 3915A, 3915B, or 3915C may not share videos and comments with those accounts. Other users 3940 may access brand channels and videos 3935 depending on which brand or brands the respective user follows, and friend and group requests from other users 3940 may be received by child account 3915A, 3915B, and 3915C according to the permission settings configured by parent account 3905 (or co-parent account 3910).

Embodiments of the present invention are thus described. While the present invention has been described in particular embodiments, it should be appreciated that the present invention should not be construed as limited by such embodiments, but rather construed according to the following claims.

What is claimed is:

1. A method for accessing a social networking account, said method comprising:
creating a parent social networking account;
creating the social networking account using the parent social networking account, wherein the social networking account is associated with the parent social networking account; and
selecting the social networking account using the parent social networking account to view the social networking account from the parent social networking account wherein activity and content of the social networking account is visible to the parent social networking account, and wherein the parent social networking account is unable to post new content to the social networking account.

2. A method as described in claim 1, further comprising:
identifying content associated with the social networking account; and
sending a request to a social networking platform associated with the social networking account to remove said content.

3. A method as described in claim 2, wherein the identifying content associated with the social networking account comprises identifying content associated with the social networking account that is inappropriate for children.

4. A method as described in claim 1, further comprising displaying a notification to the parent social networking account indicating that the parent social networking account is viewing the social networking account.

5. A method as described in claim 1, further comprising:
setting permission for the social networking account using the parent social networking account; and
sharing videos, comments, and requests using the social networking account according to the permissions of the social networking account as set by the parent social networking account.

6. A method as described in claim 1, wherein said content comprises at least one of a video message and a text comment.

7. A method as described in claim 1, wherein said activity comprises at least one of adding a new friend, accepting a friend request, creating a new group, accepting a group request, and deleting a group.

8. A method as described in claim 1, wherein said selecting the social networking account comprises selecting the social networking account from a list of associated social networking accounts to the parent social networking account.

9. A system for viewing activity and content of a social networking account, said system comprising:
a server operable to store social networking content and activity, and to transmit the social networking content to client accounts;
a first client account; and
a second client account associated with the first client account, wherein the second client account is created using the first client account, wherein the first client account selects the second client account to mirror content and activity associated with the second client account, wherein the content and activity of the second client account is visible to the first client account as if the first client account was logged-in to the second client account, wherein the first client account is restricted from posting new content to the second client account, wherein the first client account is associated with a parent, and wherein the second client account is associated with a minor child.

10. A system as described in claim 9, wherein the first client account is configured to identify content associated with the second client account and send a request to a social networking platform on said server and associated with the second client account to remove said content.

11. A system as described in claim 10, wherein the content associated with the second client account comprises identifying content associated with the second client account that is inappropriate for children.

12. A system as described in claim 9, wherein the first client account is configured to display a notification indicating that the first client account is in a mode allowing viewing of the second client account.

13. A system as described in claim 9, wherein the first client account is configured to set permissions for the second client account, and wherein the second client account is configured to share videos, comments, and requests according to the permissions.

14. A system as described in claim 9, wherein said content comprises at least one of a video message and a text comment.

15. A system as described in claim 9, wherein said activity comprises at least one of adding a new friend, accepting a friend request, creating a new group, accepting a group request, and deleting a group.

16. A system as described in claim 9, wherein the first client account selects the second client account by selecting the first client account from a list of client accounts associated with the first client account.

17. A system for providing access to social networking, said system comprising:
a memory configured to store data; and
a processor configured to execute instructions for performing a method of viewing a child social networking account using a parent social networking account, said method comprising:
creating the parent social networking account, wherein the parent social networking account resides on a social networking platform;
creating the social networking account using the parent social networking account, wherein the social networking account is associated with the parent social networking account and resides on the social networking platform;
selecting the social networking account using the parent social networking account to view the social networking account from within the parent social networking account wherein activity and content of the social networking account is rendered visible to the parent social networking account, and wherein the parent social networking account is restricted from posting new content to the social networking account.

18. A system as described in claim 17, wherein the method further comprises:
identifying content associated with the social networking account; and
sending a request to the social networking platform associated with the social networking account to remove said content.

19. A system as described in claim 18, wherein the identifying content associated with the social networking account comprises identifying content associated with the social networking account that is inappropriate for children.

20. A system as described in claim 17, wherein the method further comprises displaying a notification to the parent social networking account indicating that the parent social networking account is viewing the social networking account.

21. A system as described in claim 17, wherein the method further comprises:
   setting permissions for the social networking account using the parent social networking account; and
   sharing videos, comments, and requests using the social networking account according to the permissions of the social networking account as set by the parent social networking account.

22. A system as described in claim 17, wherein said content comprises at least one of a video message and a text comment.

23. A system as described in claim 17, wherein said activity comprises at least one of adding a new friend, accepting a friend request, creating a new group, accepting a group request, and deleting a group.

24. A method of viewing content of a social networking platform, said method comprising:
   on a parent account of said social networking platform, establishing one or more linked child accounts wherein said parent account enforces programmable permissions defining allowable actions of said one or more linked child accounts;
   on said parent account, rendering a display comprising a listing of said one or more linked child accounts;
   responsive to a selection of a first child account of said listing, displaying information pertaining to selectable actions that can be invoked by said parent account that pertain to said first child account, wherein said information comprises an on-screen button associated with a first mode of operation; and
   responsive to a selection of said on-screen button, invoking said first mode of operation wherein said first mode of operation is configured to mirror content and activity of said first child account for display thereof within said parent account and wherein said first mode of operation is transparent to a user of said first child account.

25. A method as described in claim 24 wherein said first mode of operation is further configured to display an on-screen image to indicate that said first mode is operational and wherein said content and activity of said first child account is displayed within said on-screen image.

26. A method as described in claim 25 wherein said parent account is restricted from posting content into said first child account during said first mode of operation.

27. A method as described in claim 25 wherein said first mode of operation is configured to perform:
   allowing said parent account to identify first content in said first child account; and
   allowing said parent account to report said first content to said social networking platform for deletion thereof from said first child account.

28. A method as described in claim 25, wherein said activity comprises at least one of adding a new friend, accepting a friend request, creating a new group, accepting a group request, deleting a group, following a new brand, and posting a video reply.

* * * * *